US007830046B2

(12) United States Patent
Binnard et al.

(10) Patent No.: US 7,830,046 B2
(45) Date of Patent: Nov. 9, 2010

(54) DAMPER FOR A STAGE ASSEMBLY

(75) Inventors: Michael Binnard, Belmont, CA (US); Douglas C. Watson, Campbell, CA (US); Jean-Marc Gery, Los Angeles, CA (US)

(73) Assignee: Nikon Corporation, Tokyo (JP)

( * ) Notice: Subject to any disclaimer, the term of this patent is extended or adjusted under 35 U.S.C. 154(b) by 352 days.

(21) Appl. No.: 11/725,024

(22) Filed: Mar. 16, 2007

(65) Prior Publication Data

US 2008/0225253 A1    Sep. 18, 2008

(51) Int. Cl.
H02K 41/00 (2006.01)
(52) U.S. Cl. .......................................... 310/12; 355/53
(58) Field of Classification Search ................... 310/12, 310/13, 14; 355/53, 72
See application file for complete search history.

(56) References Cited

U.S. PATENT DOCUMENTS

| | | | |
|---|---|---|---|
| 5,528,100 A | 6/1996 | Igeta et al. | |
| 5,528,118 A | 6/1996 | Lee | |
| 5,623,853 A | 4/1997 | Novak et al. | |
| 5,668,672 A | 9/1997 | Oomura | |
| 5,684,856 A * | 11/1997 | Itoh et al. | 378/34 |
| 5,689,377 A | 11/1997 | Takahashi et al. | |
| 5,835,275 A | 11/1998 | Takahashi et al. | |
| 5,874,820 A | 2/1999 | Lee | |
| 5,909,272 A * | 6/1999 | Osanai et al. | 355/53 |
| 5,969,411 A | 10/1999 | Fukaya | |
| 6,116,389 A * | 9/2000 | Allaei | 188/378 |
| 6,208,407 B1 | 3/2001 | Loopstra | |
| 6,341,007 B1 | 1/2002 | Nishi et al. | |
| 6,400,441 B1 | 6/2002 | Nishi et al. | |
| 6,549,269 B1 | 4/2003 | Nishi et al. | |
| 6,590,634 B1 | 7/2003 | Nishi et al. | |
| 6,731,029 B2 * | 5/2004 | Shikayama et al. | 310/58 |

(Continued)

FOREIGN PATENT DOCUMENTS

EP        0816892        1/1998

(Continued)

OTHER PUBLICATIONS

Written Opinion for WO 2006/068233, Kazuya Ono et al., Jun. 29, 2006, Tokyo, Japan.

*Primary Examiner*—Michael C Zarroli
(74) *Attorney, Agent, or Firm*—Roeder & Broder LLP

(57) ABSTRACT

A stage assembly (220) that moves a work piece (200) along a first axis includes a stage base (236), a guide bar (238), a device table (240) that retains the work piece (200), a mover assembly (242), and a damper (225). The damper (225) can be a passive, electromagnetic damper that passively dampens movement of the guide bar (238) relative to the stage base (236) along a second axis that is orthogonal to the first axis. The damper (225) can include a magnet array (356) and a conductor (366) that is positioned in a magnetic field that surrounds the magnet array (356). With this design, relative movement between the guide bar (238) and the stage base (236) along the second axis induces the flow of current in the conductor (366) and eddy current damping. The damper (225) can include a first damper subassembly (252A) that is coupled to the guide bar (238) and a second damper subassembly (252B) that is coupled to the stage base (236).

56 Claims, 15 Drawing Sheets

U.S. PATENT DOCUMENTS

| | | | |
|---|---|---|---|
| 7,030,964 B2 * | 4/2006 | Akutsu et al. | 355/53 |
| 7,084,538 B2 * | 8/2006 | Takashima | 310/90.5 |
| 2002/0050571 A1 | 5/2002 | Watson | |
| 2003/0202167 A1 * | 10/2003 | Binnard | 355/72 |
| 2004/0080225 A1 | 4/2004 | Takashima | |
| 2004/0252287 A1 * | 12/2004 | Binnard et al. | 355/53 |
| 2008/0106361 A1 * | 5/2008 | Makarovic | 335/100 |

FOREIGN PATENT DOCUMENTS

| | | |
|---|---|---|
| EP | 0816892 | 6/1999 |
| JP | 56-6666 | 1/1981 |
| JP | 1-255404 | 10/1989 |
| JP | 8-166745 | 12/1994 |
| JP | 8-330224 | 12/1996 |
| WO | WO99/23692 | 5/1999 |
| WO | WO99/49504 | 9/1999 |
| WO | WO 2006/068233 | 6/2006 |
| WO | WO2006/068233 | 6/2006 |

\* cited by examiner

DAMPER FOR A STAGE ASSEMBLY

BACKGROUND

Exposure apparatuses for semiconductor processing are commonly used to transfer images from a reticle onto a semiconductor wafer during semiconductor processing. A typical exposure apparatus includes an illumination source, a reticle stage assembly that positions a reticle, an optical assembly, a wafer stage assembly that positions a semiconductor wafer, a measurement system, and a control system.

A common type of stage assembly includes a stage base, a stage, and a mover assembly that moves the stage relative to the stage base. With certain stage designs, vibration and disturbances from the ground or the environment are transferred to the stage base and subsequently to the stage. This can cause errors in the positioning of the stage. The size of the images and features within the images transferred onto the wafer from the reticle are extremely small. As a result thereof, the precise positioning of the wafer and the reticle is critical to the manufacture of high density, semiconductor wafers.

SUMMARY

The present invention is directed a stage assembly that includes a stage base, a stage, a mover assembly that moves the stage relative to the stage base along a first axis, and a damper. In certain embodiments, the damper is a passive, electromagnetic damper that passively dampens movement of the stage relative to the stage base along a second axis that intersects the first axis. Further, the second axis can be orthogonal to the first axis.

For example, the damper can include a magnet array and a conductor that is positioned in the magnetic field that surrounds the magnet array. With this design, in certain embodiments, relative movement between conductor and the magnetic field generates eddy current damping.

In one embodiment, the damper includes a first damper subassembly that is coupled to the first stage and a second damper subassembly that is coupled to the stage base. As an example, one of the damper subassemblies includes the magnet array and the other damper subassembly includes a conductor that is positioned within the magnetic field. In another example, one of the damper subassemblies includes both the magnet array and the conductor. With certain embodiments, there is no relative movement between the conductor and the magnet array. In these embodiments, for example, the strength of the magnetic field changes during movement along the Y axis and this induces the flow of current in the conductor.

In yet another embodiment, one of the damper subassemblies includes a first magnet array, a spaced apart second magnet array, and the other damper subassembly includes a conductor positioned between the magnet arrays.

As provided herein, for example, the conductor can be a shorted coil or a conductive plate.

In yet another embodiment, damper includes a magnet array that produces a magnetic field having a magnetic flux, and a conductor positioned in the magnetic field. In this embodiment, relative movement between the first stage and the stage base along the second axis causes a change in magnetic flux, which induces the flow of current in the conductor.

In still another embodiment, relative movement between the conductor and the magnetic field induces the flow of current in the conductor because the magnetic field varies along the second axis.

In certain embodiments, the damper includes a magnetic field which varies in strength or polarity along the second axis, but is substantially constant along the first axis.

Additionally, the mover assembly can move the stage about a third axis that is orthogonal to the first axis and the second axis. Further, the stage assembly can include a device table that is moved by the mover assembly along the second axis relative to the stage base.

Further, the present invention is also directed to an exposure apparatus, a device, a wafer, a method for moving a stage, a method for manufacturing an exposure apparatus, and a method for manufacturing an object or a wafer.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
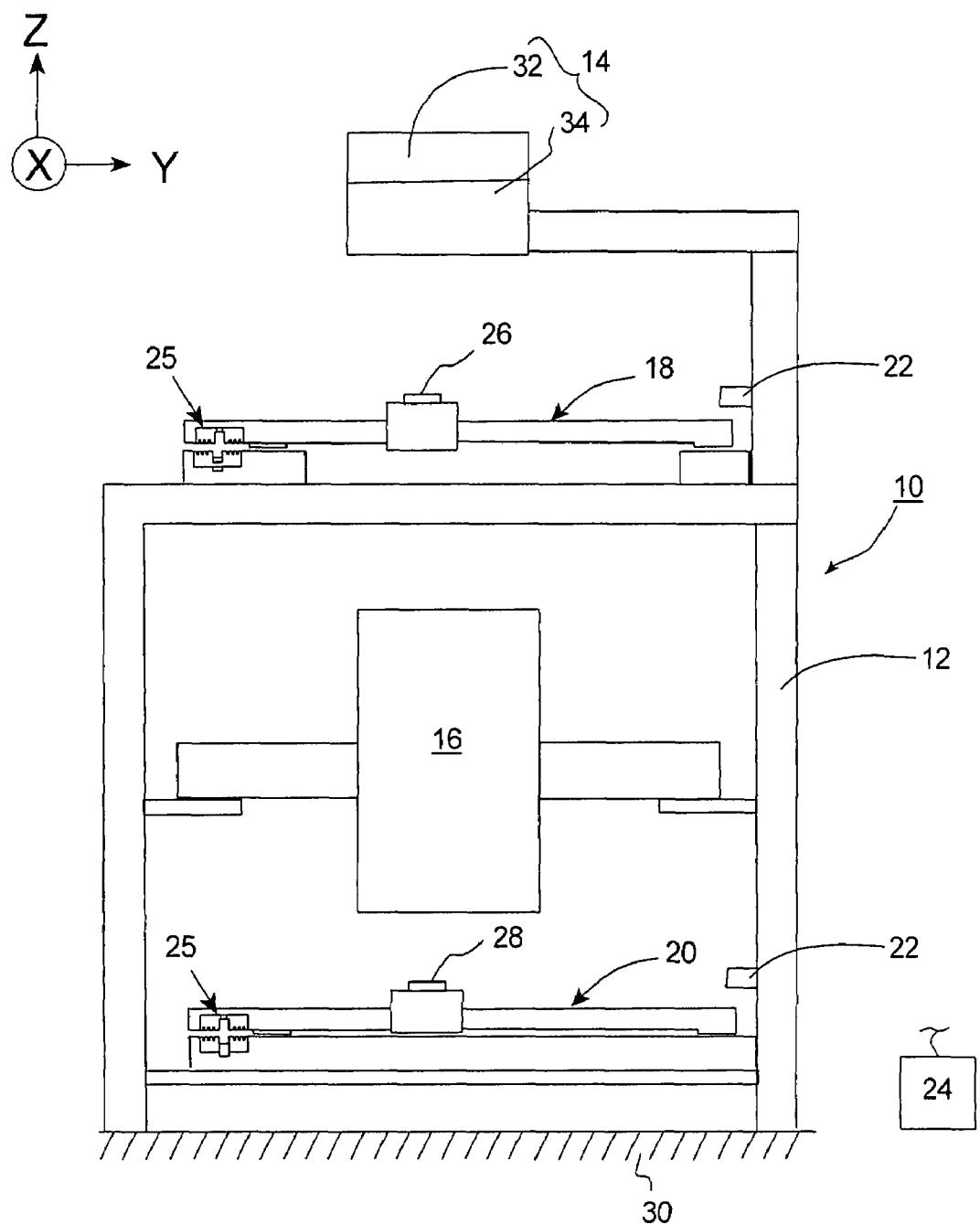
FIG. 1 is a schematic illustration of an exposure apparatus having features of the present invention.

FIG. 1 is a schematic illustration of a precision assembly, namely an exposure apparatus 10 having features of the present invention. The exposure apparatus 10 includes an apparatus frame 12, an illumination system 14 (irradiation apparatus), an optical assembly 16 (optical member), a reticle stage assembly 18, a wafer stage assembly 20, a measurement system 22, and a control system 24. As described below, one or both stage assemblies 18, 20 include a damper 25 that dampens movement and inhibits oscillation of a portion of the respective stage assembly 18, 20. The design of the components of the exposure apparatus 10 can be varied to suit the design requirements of the exposure apparatus 10.

A number of Figures include an orientation system that illustrates an X axis, a Y axis that is orthogonal to the X axis and a Z axis that is orthogonal to the X and Y axes. It should be noted that these axes can also be referred to as the first, second and third axes.

The exposure apparatus 10 is particularly useful as a lithographic device that transfers a pattern (not shown) of an integrated circuit from a reticle 26 onto a semiconductor wafer 28. The exposure apparatus 10 mounts to a mounting base 30, e.g., the ground, a base, or floor or some other supporting structure.

There are a number of different types of lithographic devices. For example, the exposure apparatus 10 can be used as a scanning type photolithography system that exposes the pattern from the reticle 26 onto the wafer 28 with the reticle 26 and the wafer 28 moving synchronously. In a scanning type lithographic device, the reticle 26 is moved perpendicularly to an optical axis of the optical assembly 16 by the reticle stage assembly 18 and the wafer 28 is moved perpendicularly to the optical axis of the optical assembly 16 by the wafer stage assembly 20. Scanning of the reticle 26 and the wafer 28 occurs while the reticle 26 and the wafer 28 are moving synchronously.

Alternatively, the exposure apparatus 10 can be a step-and-repeat type photolithography system that exposes the reticle 26 while the reticle 26 and the wafer 28 are stationary. In the step and repeat process, the wafer 28 is in a constant position relative to the reticle 26 and the optical assembly 16 during the exposure of an individual field. Subsequently, between consecutive exposure steps, the wafer 28 is consecutively moved with the wafer stage assembly 20 perpendicularly to the optical axis of the optical assembly 16 so that the next field of the wafer 28 is brought into position relative to the optical assembly 16 and the reticle 26 for exposure. Following this process, the images on the reticle 26 are sequentially exposed onto the fields of the wafer 28, and then the next field of the wafer 28 is brought into position relative to the optical assembly 16 and the reticle 26.

However, the use of the exposure apparatus 10 provided herein is not limited to a photolithography system for semiconductor manufacturing. The exposure apparatus 10, for example, can be used as an LCD photolithography system that exposes a liquid crystal display device pattern onto a rectangular glass plate or a photolithography system for manufacturing a thin film magnetic head. Further, the present invention can also be applied to a proximity photolithography system that exposes a mask pattern from a mask to a substrate with the mask located close to the substrate without the use of a lens assembly.

The apparatus frame 12 is rigid and supports the components of the exposure apparatus 10. The apparatus frame 12 illustrated in FIG. 1 supports the stage assemblies 18, 20, the optical assembly 16 and the illumination system 14 above the mounting base 30.

The illumination system 14 includes an illumination source 32 and an illumination optical assembly 34. The illumination source 32 emits a beam (irradiation) of light energy. The illumination optical assembly 34 guides the beam of light energy from the illumination source 32 to the optical assembly 16. The beam illuminates selectively different portions of the reticle 26 and exposes the wafer 28. In FIG. 1, the illumination source 32 is illustrated as being supported above the reticle stage assembly 18. Typically, however, the illumination source 32 is secured to one of the sides of the apparatus frame 12 and the energy beam from the illumination source 32 is directed to above the reticle stage assembly 18 with the illumination optical assembly 34.

The illumination source 32 can be a g-line source (436 nm), an i-line source (365 nm), a KrF excimer laser (248 nm), an ArF excimer laser (193 nm) or a $F_2$ laser (157 nm). Alternatively, the illumination source 32 can generate charged particle beams such as an x-ray or an electron beam. For instance, in the case where an electron beam is used, thermionic emission type lanthanum hexaboride ($LaB_6$) or tantalum (Ta) can be used as a cathode for an electron gun. Furthermore, in the case where an electron beam is used, the structure could be such that either a mask is used or a pattern can be directly formed on a substrate without the use of a mask.

The optical assembly 16 projects and/or focuses the light passing through the reticle 26 to the wafer 28. Depending upon the design of the exposure apparatus 10, the optical assembly 16 can magnify or reduce the image illuminated on the reticle 26. The optical assembly 16 need not be limited to a reduction system. It could also be a 1× or magnification system.

When far ultra-violet rays such as the excimer laser is used, glass materials such as quartz and fluorite that transmit far ultra-violet rays can be used in the optical assembly 16. When the $F_2$ type laser or x-ray is used, the optical assembly 16 can be either catadioptric or refractive (a reticle should also preferably be a reflective type), and when an electron beam is used, electron optics can consist of electron lenses and deflectors. The optical path for the electron beams should be in a vacuum.

Also, with an exposure device that employs vacuum ultra-violet radiation (VUV) of wavelength 200 nm or lower, use of the catadioptric type optical system can be considered. Examples of the catadioptric type of optical system include the disclosure Japan Patent Application Disclosure No. 8-171054 published in the Official Gazette for Laid-Open Patent Applications and its counterpart U.S. Pat. No. 5,668, 672, as well as Japan Patent Application Disclosure No. 10-20195 and its counterpart U.S. Pat. No. 5,835,275. In these cases, the reflecting optical device can be a catadioptric optical system incorporating a beam splitter and concave mirror. Japan Patent Application Disclosure No. 8-334695 published in the Official Gazette for Laid-Open Patent Applications and its counterpart U.S. Pat. No. 5,689,377 as well as Japan Patent Application Disclosure No. 10-3039 and its counterpart U.S. patent application No. 873,605 (Application Date: Jun. 12, 1997) also use a reflecting-refracting type of optical system incorporating a concave mirror, etc., but without a beam splitter, and can also be employed with this invention. As far as is permitted, the disclosures in the above-mentioned U.S. patents, as well as the Japan patent applications published in the Official Gazette for Laid-Open Patent Applications are incorporated herein by reference.

The reticle stage assembly 18 holds and positions the reticle 26 relative to the optical assembly 16 and the wafer 28. Somewhat similarly, the wafer stage assembly 20 holds and positions the wafer 28 with respect to the projected image of the illuminated portions of the reticle 26.

Further, in photolithography systems, when linear motors (see U.S. Pat. Nos. 5,623,853 or 5,528,118) are used in a wafer stage or a mask stage, the linear motors can be either an air levitation type employing air bearings or a magnetic levitation type using Lorentz force or reactance force. As far as is permitted, the disclosures in U.S. Pat. Nos. 5,623,853 and 5,528,118 are incorporated herein by reference.

Alternatively, one of the stages could be driven by a planar motor, which drives the stage by an electromagnetic force generated by a magnet unit having two-dimensionally arranged magnets and an armature coil unit having two-dimensionally arranged coils in facing positions. With this type of driving system, either the magnet unit or the armature coil unit is connected to the stage and the other unit is mounted on the moving plane side of the stage.

Movement of the stages as described above generates reaction forces that can affect performance of the photolithography system. Reaction forces generated by the wafer (substrate) stage motion can be mechanically transferred to the floor (ground) by use of a frame member as described in U.S. Pat. No. 5,528,100 and published Japanese Patent Application Disclosure No. 8-136475. Additionally, reaction forces generated by the reticle (mask) stage motion can be mechanically transferred to the floor (ground) by use of a frame member as described in U.S. Pat. No. 5,874,820 and published Japanese Patent Application Disclosure No. 8-330224. As far as is permitted, the disclosures in U.S. Pat. Nos. 5,528, 100 and 5,874,820 and Japanese Patent Application Disclosure No. 8-330224 are incorporated herein by reference.

The measurement system 22 monitors movement of the reticle 26 and the wafer 28 relative to the optical assembly 16 or some other reference. With this information, the control system 24 can control the reticle stage assembly 18 to precisely position the reticle 26 and the wafer stage assembly 20 to precisely position the wafer 28. For example, the measurement system 22 can utilize multiple laser interferometers, encoders, and/or other measuring devices.

The control system 24 is electrically connected to the reticle stage assembly 18, the wafer stage assembly 20, and the measurement system 22. The control system 24 receives information from the measurement system 22 and controls the stage assemblies 18, 20 to precisely position the reticle 26 and the wafer 28. The control system 24 can include one or more processors and circuits.

A photolithography system (an exposure apparatus) according to the embodiments described herein can be built by assembling various subsystems, including each element listed in the appended claims, in such a manner that prescribed mechanical accuracy, electrical accuracy, and optical accuracy are maintained. In order to maintain the various accuracies, prior to and following assembly, every optical system is adjusted to achieve its optical accuracy. Similarly, every mechanical system and every electrical system are adjusted to achieve their respective mechanical and electrical accuracies. The process of assembling each subsystem into a photolithography system includes mechanical interfaces, electrical circuit wiring connections and air pressure plumbing connections between each subsystem. There is also a process where each subsystem is assembled prior to assembling a photolithography system from the various subsystems. Once a photolithography system is assembled using the various subsystems, a total adjustment is performed to make sure that accuracy is maintained in the complete photolithography system. Additionally, it is desirable to manufacture an exposure system in a clean room where the temperature and cleanliness are controlled.

This invention can be utilized in an immersion type exposure apparatus with taking suitable measures for a liquid. For example, PCT Patent Application WO 99/49504 discloses an exposure apparatus in which a liquid is supplied to the space between a substrate (wafer) and a projection lens system in exposure process. As far as is permitted, the disclosures in WO 99/49504 are incorporated herein by reference.

Further, this invention can be utilized in an exposure apparatus that comprises two or more substrate and/or reticle stages. In such apparatus, the additional stage may be used in parallel or preparatory steps while the other stage is being used for exposing. Such a multiple stage exposure apparatus are described, for example, in Japan Patent Application Disclosure No. 10-163099 as well as Japan Patent Application Disclosure No. 10-214783 and its counterparts U.S. Pat. No. 6,341,007, No. 6,400,441, No. 6,549,269, and No. 6,590,634. Also it is described in Japan Patent Application Disclosure No. 2000-505958 and its counterparts U.S. Pat. No. 5,969, 411 as well as U.S. Pat. No. 6,208,407. As far as is permitted, the disclosures in the above-mentioned U.S. Patents, as well as the Japan Patent Applications, are incorporated herein by reference.

This invention can be utilized in an exposure apparatus that has a movable stage retaining a substrate (wafer) for exposing it, and a stage having various sensors or measurement tools for measuring, as described in Japan Patent Application Disclosure 11-135400. As far as is permitted, the disclosures in the above-mentioned Japan patent application are incorporated herein by reference.

Figure 2A:
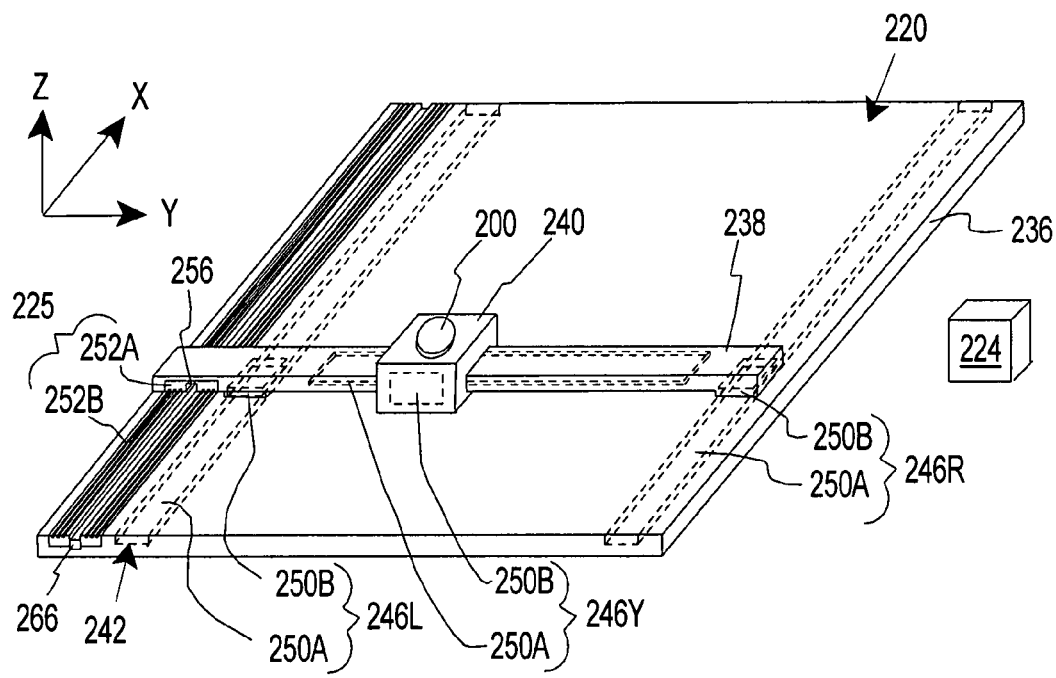
FIG. 2A is a simplified perspective view of one embodiment of a stage assembly having features of the present invention.

FIG. 2A is a simplified perspective view of a stage assembly 220 that is used to position a work piece 200 and a control system 224 that controls the stage assembly 220. For example, the stage assembly 220 can be used as the wafer stage assembly 20 in the exposure apparatus 10 of FIG. 1. In this embodiment, the stage assembly 220 would position the wafer during manufacturing of the semiconductor wafer. Alternatively, the stage assembly 220 can be used to move other types of work pieces 200 during manufacturing and/or inspection, to move a device under an electron microscope (not shown), or to move a device during a precision measurement operation (not shown). For example, the stage assembly 220 could be designed to function as the reticle stage assembly 18 that positions the reticle. Alternatively, the stage assembly 220 can be used to position a stage without a work piece.

In FIG. 2A, the stage assembly 220 includes a stage base 236, a guide bar 238, a device table 240, a mover assembly 242, and a damper 225. The size, shape, and design of each these components can be varied. It should be noted that the guide bar 238 and/or the device table 240 can also be referred to as the stage, the first stage, and/or the second stage. For example, the guide bar 238 can be referred to as the first stage and the device table 240 can be referred to as the second stage. Alternatively, the device table 240 can be referred to as the first stage and the guide bar 238 can be referred to as the second stage.

In FIG. 2A, the stage base 236 supports some of the components of the stage assembly 220 and guides the movement of the guide bar 238 and the device table 240 along the X axis, along the Y axis and about the Z axis. In this embodiment, the stage base 236 is generally rectangular shaped.

The guide bar 238 is used to move the device table 240. In FIG. 2A, the guide bar 238 is generally rectangular beam shaped and includes a first end and a second end. In FIG. 2A, a bearing (not shown) supports the guide bar 238 above the stage base 236 and allows the guide bar 238 to move relative to the stage base 236 along the X axis, along the Y axis and about the Z axis. The bearing, for example, can be a magnetic type bearing, a roller type assembly, or a fluid type bearing such as a vacuum preload type fluid bearing.

In one embodiment, the device table 240 retains the work piece 200. In FIG. 2A, the device table 240 is generally block shaped and includes an aperture for receiving a portion of the guide bar 238 and a chuck (not shown) for retaining the work piece 200.

One or more bearings (not shown) support the device table 240 relative to the stage base 236 and the guide bar 238. The bearings allow the device table 240 to move relative to the guide bar 238 along the Y axis, and allow the device table 240 to move relative to the stage base 236 along the X axis, along the Y axis and about the Z axis. The bearings, for example, can be a magnetic type bearing, a roller type assembly, or a fluid type bearing such as a vacuum preload type fluid bearing.

The mover assembly 242 moves the guide bar 238 and the device table 240. The type of movement can vary according to the design requirements of the stage assembly 220. For example, the mover assembly 242 can be designed to move the device table 240 with three degrees of movement. Alternatively, the mover assembly 242 can be designed to move the device table 240 with more than three or less than three degrees of movement. The mover assembly 242 can include one or more movers.

In FIG. 2A, the mover assembly 242 moves the guide bar 238 and the device table 240 along the X axis and about the Z axis relative to the stage base 236, and moves the device table 240 along the Y axis relative to the guide bar 238 and the stage base 236. In this embodiment, the mover assembly 242 includes a left X mover 246L (illustrated in phantom), a right X mover 246R (illustrated in phantom), and a Y mover 246Y (illustrated in phantom). The X movers 246L, 246R move the guide bar 238, and the device table 240 along the X axis and with a limited range of motion about the Z axis, and the Y mover 246Y moves the device table 240 along the Y axis relative to the guide bar 238. The motion about the Z axis is achieved by controlling a difference in the amount of forces generated by the left X mover 246A and the right X mover 246R.

The design of each mover 246L, 246R, 246Y can be varied to suit the movement requirements of the mover assembly 242. In the embodiment illustrated in FIG. 2A, each of the movers 246L, 246R, 246Y includes a first mover component 250A and a second mover component 250B that interacts with the first mover component 250A. In this embodiment, each of the movers 246L, 246R, 246Y is a linear motor and one of the mover components 250A, 250B includes a magnet array having one or more magnets and the other mover components 250B, 250A includes a conductor array having one or more coils. In FIG. 2A, the first mover component 250A of each X mover 246L, 246R is secured to the stage base 236 and the second mover component 250B of each X mover 246L, 246R is secured to the guide bar 238. Further, the first mover component 250A of the Y mover 246Y is secured to the guide bar 248 and the second mover component 250B of the Y mover 246Y is secured to the device table 240.

Alternatively, one or more of the movers 246L, 246R, 246Y can be another type of motor, such as a rotary motors, a voice coil motor, an electromagnetic mover, a planar motor, or some other force mover.

Additionally, the device table 240 can include an upper table (not shown) that is moved and positioned with an upper table mover assembly (not shown). With this design, the upper table mover assembly can move and position the upper table with one or more degrees of movement.

The damper 225 dampens the movement of a stage, e.g. the guide bar 238, along an axis that is orthogonal to the axis of movement of the stage. In certain embodiments, the damper 225 is a passive electromagnetic damper that passively dampens movement of the guide bar 238 along the Y axis in a non-contact fashion. For example, the damper 225 can include a conductor 266 and a magnet array 256 having one or more magnets. The magnet array 256 creates a magnetic field and the conductor 266 is positioned in the magnetic field. As provided herein, in certain embodiments, relative movement between the conductor 266 and the magnetic field induces current in the conductor 266 which causes eddy current damping. With this design, there is no need to actively control the operation of the damper 225 with the control system 224 and there is no need for additional sensors and electronics to control the damper 225. Stated in another fashion, there is no need to direct power to the conductor 266 of the damper 225 to dampen movement. As a result thereof, the control system 224 is not in direct electrical communication with the damper 225.

Additionally, in certain designs, the damper 225 also guides the movement of the guide bar 238 along one axis in a non-contact electromagnetic fashion. For example, in FIG. 2A, the damper 225 inhibits movement of the guide bar 238 along the Y axis and allows for movement of the guide bar 238 along the X axis and about the Z axis.

In FIG. 2A, the damper 225 includes a first damper subassembly 252A and second damper subassembly 252B. The first damper subassembly 252A is secured and coupled to the guide bar 238 and the second damper subassembly 252B is secured and coupled to the stage base 236. Further, in this embodiment, the first damper subassembly 252A is positioned in a cut-out in the guide bar 238 and the second damper subassembly 252B is positioned in a cut-out in the stage base 236.

Additionally, the first damper subassembly 252A is positioned adjacent to and spaced apart from the second damper subassembly 252B during the movement of the guide bar 238 and the first damper subassembly 252A along at least a portion of the X axis. In FIG. 2A, the second damper subassembly 252B extends along the length of travel of the guide bar 238 along the X axis. With this design, the damper 225 dampens movement of the guide bar 238 along the Y axis regardless of the position of the guide bar 238 along the X axis.

Figure 2B:
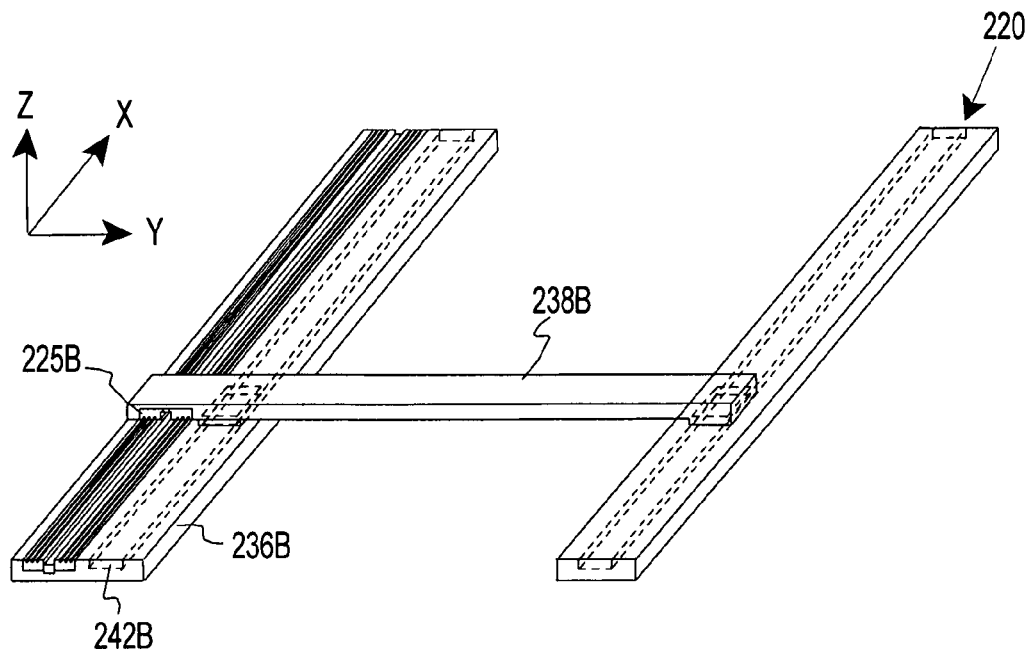
FIG. 2B is a simplified perspective view of another embodiment of a stage assembly having features of the present invention.

FIG. 2B is a perspective view of another embodiment of a stage assembly 220B that can position a stage 238B. In this embodiment, for example, the stage 238B can be used as a reticle blind. In FIG. 2B, the stage assembly 220B includes a stage base 236B, the stage 238B, a mover assembly 242B, and a damper 225B that are somewhat similar to the corresponding components described above. However, in this embodiment, the stage base 236B includes two spaced apart base sections and the mover assembly 242B does not include a Y mover 246Y (illustrated in FIG. 2A).

Figure 3A:
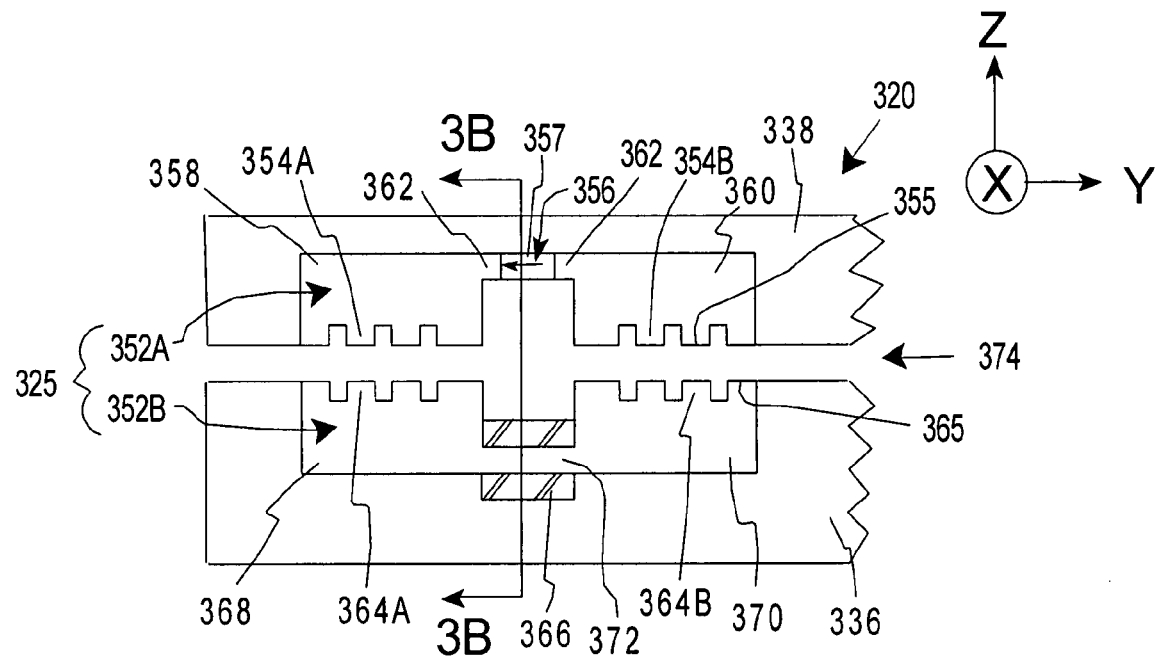
FIG. 3A is a simplified end view of a first embodiment of a portion of a stage assembly, in partial cut-away having features of the present invention.

FIG. 3A is a simplified end view of a portion of a stage assembly 320, in partial cut-away including a portion of the guide bar 338, a portion of the stage base 336, and a first embodiment of the damper 325 including a first damper subassembly 352A and a second subassembly 352B.

In this embodiment, the first damper subassembly 352A defines a pair of spaced apart first tooth assemblies 354A, 354B each including a plurality of first teeth 355, and a magnet array 356 including a magnet 357 that separates the first tooth assemblies 354A, 354B. With this design, the first teeth 355 of the left first tooth assembly 354A are at an opposite magnetic polarity as the first teeth 355 of the right first tooth assembly 354B.

The number of first teeth 355 in each of the first tooth assemblies 354A, 354B can vary. In FIG. 3A, each of the first tooth assemblies 354A, 354B includes four first teeth 355. Alternatively, one or both of the first tooth assemblies 354A, 354B can include more than four or less than four first teeth 355.

In FIG. 3A, the first damper subassembly 352A is generally rectangular block shaped and includes a left section 358, a right section 360, and a pair of spaced apart intermediate sections 362 positioned between the left section 358 from the right section 360. In this embodiment, (i) the bottom of the left section 358 includes a plurality of grooves that define the left first teeth 355, (ii) the bottom of the right section 360 includes a plurality of grooves that define the right first teeth 355, and (iii) the intermediate sections 362 are narrower than the left and right sections 358, 360. Each of the sections 358, 360, 362 can be made of a magnetic or magnetizable material such as iron. The magnet 357 is generally rectangular shaped and is positioned between the intermediate sections 362. The magnet 357 produces a magnetic field and can be made of neodymium-iron-boron (NdFeB) or another suitable magnet material.

The second damper subassembly 352B defines a pair of spaced apart second tooth assemblies 364A, 364B each including a plurality of second teeth 365, and a conductor 366 (in cut-away) that separates the second tooth assemblies 364A, 364B. The number of second teeth 365 in each of the second tooth assemblies 364A, 364B can vary. In FIG. 3A, each of the second tooth assemblies 364A, 364B includes four second teeth 365. Alternatively, one or both of the second tooth assemblies 364A, 364B can include more than four or less than four second teeth 365.

In FIG. 3A, the second damper subassembly 352B is generally rectangular block shaped and includes a left section 368, a right section 370, and an intermediate section 372 that separates the left section 368 from the right section 370. In this embodiment, (i) the top of the left section 368 includes a plurality of grooves that define the left second teeth 365, (ii) the top of the right section 370 includes a plurality of grooves that define the right second teeth 365, and (iii) the intermediate section 372 is narrower than the left and right sections 368, 370. Each of the sections 368, 370, 372 can be made of a magnetic or magnetizable material such as iron.

In one non-exclusive embodiment, one or more of the first teeth 355 and/or the second teeth 365 have a width of between approximately 1 mm and 10 mm, the adjacent first teeth 355 are separated by a spacing of between approximately 1 mm and 10 mm, and the adjacent second teeth 365 are separated by a spacing of between approximately 1 mm and 10 mm. Further, in the embodiment illustrated in FIG. 3A, (i) the number of first teeth 355 in the left first tooth assembly 354A is equal to the number of second teeth 365 in the left second tooth assembly 364A, and (ii) the number of first teeth 355 in the right first tooth assembly 354B is equal to the number of second teeth 365 in the right second tooth assembly 364B.

The design and location of the conductor 366 can be varied. In FIG. 3A, the conductor 366 is an annular shaped coil that encircles and that is wrapped around the intermediate section 372. The conductor 366 can be made of metal such as aluminum, copper or any other electrically conductive material. In certain embodiments, the conductor 366 is shorted.

A gap 374 is maintained between the first damper subassembly 352A and the second damper subassembly 352B. The size of the gap 374 can be varied to achieve the performance characteristics of the damper 325. In alternative non-exclusive embodiments, the gap 374 is approximately 0.1, 0.2, 0.5, 1.0, or 2.0 mm.

In this embodiment, the damper 325 can act as a variable-reluctance electromagnetic guide for the moving guide bar 338 that allows for motion of the guide bar 338 in the X direction and self-centering stiffness along the Y axis. When the first damper subassembly 352A moves relative to the second damper subassembly 352B along the Y axis, the first teeth 355 become farther apart from the second teeth 365 and the reluctance of the device increases. When the first teeth 355 are aligned with the second teeth 365, the reluctance and the energy in the magnetic field are minimized. The attractive force is created because the first teeth 355 want to be in this minimum-energy configuration. This force provides the stiffness along the Y axis.

With the present design, magnetic flux flows between the first teeth 355 and the corresponding second teeth 365 and passes through the conductor 366. With this design, movement of the first damper subassembly 352A relative to the second damper subassembly 352B along the Y axis changes the reluctance of the magnetic circuit, changing the amount of flux, and thereby induces the flow of current in the conductor 366. This generates eddy current damping. Stated in another fashion, the relative movement between the magnetic field and the conductor 366 provides damping.

It should be noted that movement of the first damper subassembly 352A relative to the second damper subassembly 352B along the X axis does not induce the flow of current in the conductor 366 because reluctance does not change. As a result thereof, the damper 325 does not dampen movement of the guide bar 338 along the X axis. This allows the guide bar 338 to be moved along the X axis without damping.

There is also an attractive force between the teeth 355, 365. In one embodiment, a fluid bearing (not shown) or other device can be used to maintain the separation between the first teeth 355 and the second teeth 365.

Figure 3B:
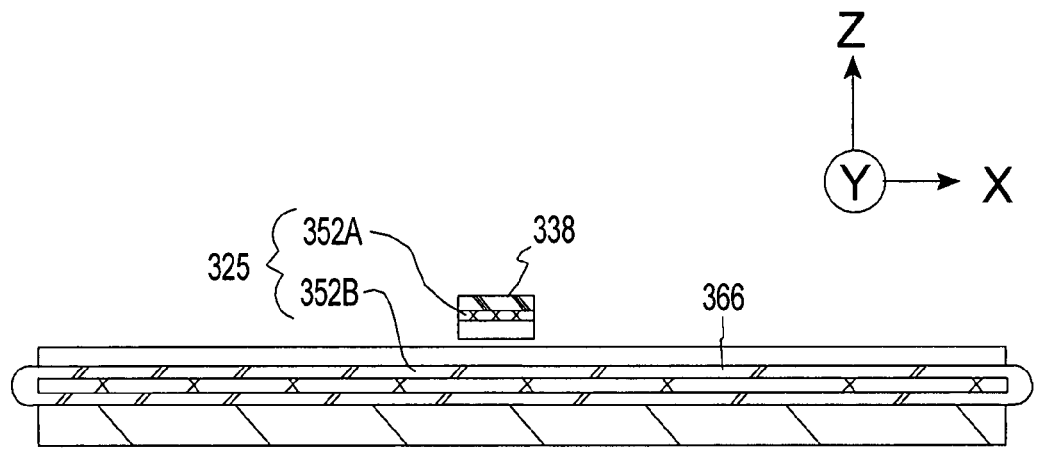
FIG. 3B is a simplified view taken on line 3B-3B in FIG. 3A.

FIG. 3B illustrates a simplified cutaway view taken on line 3B-3B of FIG. 3A of the damper 325 including the damper subassemblies 352A, 352B. In this embodiment, the conductor 366 of the second damper subassembly 352B extends along the length of travel of the guide bar 338 along the X axis. With this design, the damper 325 dampens movement of the guide bar 338 along the Y axis regardless of the position of the guide bar 338 along the X axis.

Figure 4A:
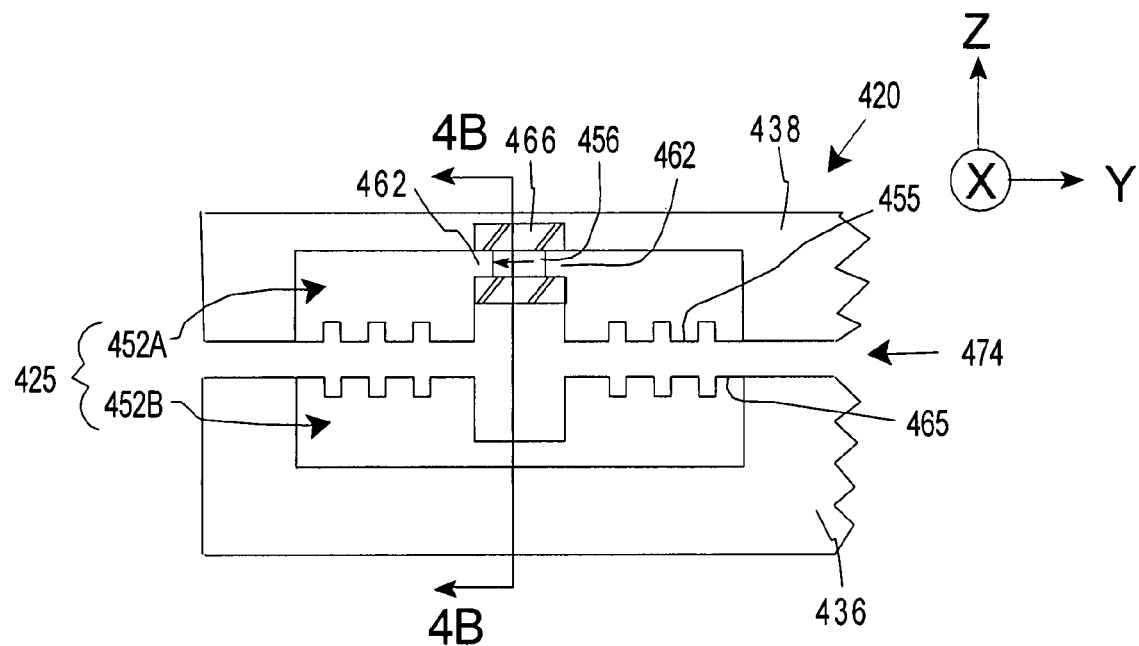
FIG. 4A is a simplified end view of another embodiment of a portion of a stage assembly, in partial cut-away having features of the present invention.

FIG. 4A is a simplified end view of a portion of the stage assembly 420, in partial cut-away including a portion of the guide bar 438, a portion of the stage base 436, and another embodiment of the damper 425 including a first damper subassembly 452A and a second subassembly 452B.

In this embodiment, the first damper subassembly 452A and the second damper subassembly 452B are somewhat similar to the corresponding components described above and illustrated in FIGS. 3A and 3B. However, in this embodiment, the conductor 466 is part of the first damper subassembly 452A. In particular, in this embodiment, the conductor 466 is a shorted coil that encircles the magnet array 456 and the intermediate sections 462.

With the present design, magnetic flux flows between the first teeth 455 and the corresponding second teeth 465 and passes through the conductor 466. With this design, movement of the first damper subassembly 452A relative to the second damper subassembly 452B along the Y axis changes the reluctance of the magnetic circuit, changing the amount of flux, and thereby induces the flow of current in the conductor 466. This generates eddy current damping. Stated in another fashion, the relative movement between the magnetic field and the conductor 466 provides damping.

In this embodiment, there is no relative movement between the conductor 466 and the magnet array 456. In this design, the strength of the magnetic field changes during movement along the Y axis and this induces the flow of current in the conductor 466.

Additionally, in this embodiment, the damper 425 also acts as a variable-reluctance electromagnetic guide for the moving guide bar 438 that allows for motion in the X direction and self-centering stiffness along the Y axis.

Figure 4B:
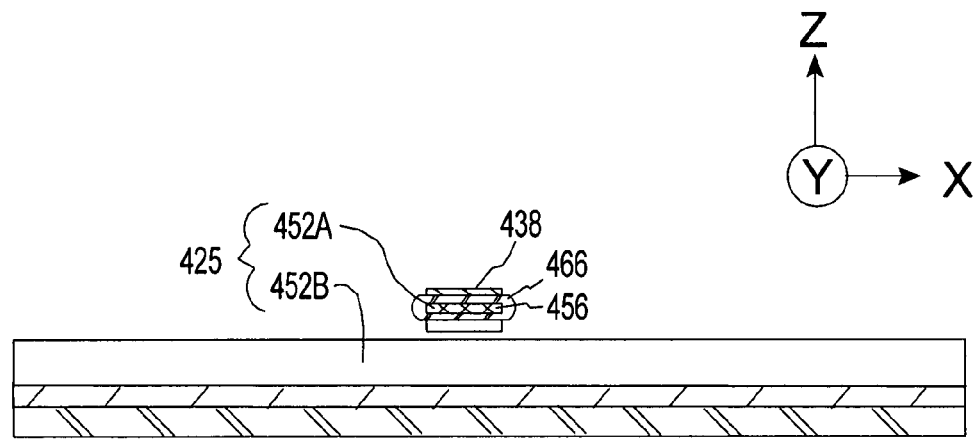
FIG. 4B is a simplified view taken on line 4B-4B in FIG. 4A.

FIG. 4B illustrates a simplified cut-away view taken on line 4B-4B of FIG. 4A of the damper 425 including the damper subassemblies 452A, 452B. In this embodiment, the second damper subassembly 452B extends along the length of travel of the guide bar 438 along the X axis. Further, FIG. 4B illustrates that the conductor 466 encircles the magnet array 456.

Figure 5A:
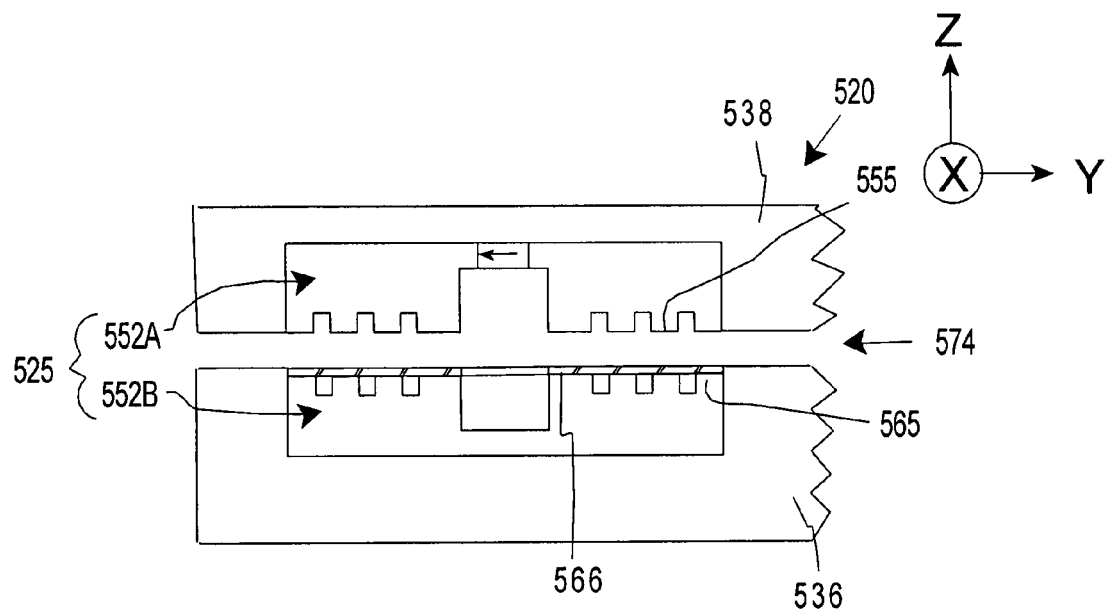
FIG. 5A is a simplified end view of yet another embodiment of a portion of a stage assembly, in partial cut-away having features of the present invention.

FIG. 5A is a simplified end view of a portion of the stage assembly 520, in partial cut-away including a portion of the guide bar 538, a portion of the stage base 536, and another embodiment of the damper 525 including a first damper subassembly 552A and a second subassembly 552B.

In this embodiment, the first damper subassembly 552A and the second damper subassembly 552B are somewhat similar to the corresponding components described above and illustrated in FIGS. 3A and 3B. However, in this embodiment, the conductor 566 (in cut-away) is an oval shaped, shorted coil that is positioned on and secured to the second teeth 565.

With the present design, a magnetic field flows between the first teeth 555 and the corresponding second teeth 556 and there is a strong magnetic flux in the gap 574 between the damper subassemblies 552A, 552B between the opposing teeth. Further, the movement of the first damper subassembly 552A relative to the second damper subassembly 552B along the Y axis induces the flow of current in the conductor 566 because each point of the conductor sees a changing flux. This generates eddy current damping. It should be noted that movement of the first damper subassembly 552A relative to the second damper subassembly 552B along the X axis does not induce the flow of current in the conductor 566. As a result thereof, the damper 525 does not dampen movement of the guide bar 538 along the X axis. This allows the guide bar 538 to be moved along the X axis without damping.

Additionally, in this embodiment, the damper 525 also acts as a variable-reluctance electromagnetic guide for the moving guide bar 538 that allows for motion in the X direction and self-centering stiffness along the Y axis.

Figure 5B:
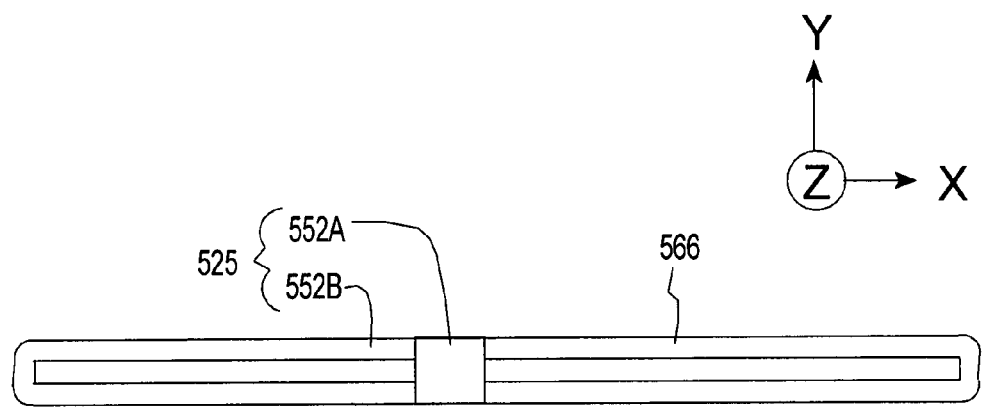
FIG. 5B is a simplified top view of a damper of FIG. 5A.

FIG. 5B illustrates a simplified top view of the damper 525 including the damper subassemblies 552A, 552B of FIG. 5A. Further, the conductor 566 extends the length of travel of the first damper subassembly 552A.

Figure 6A:
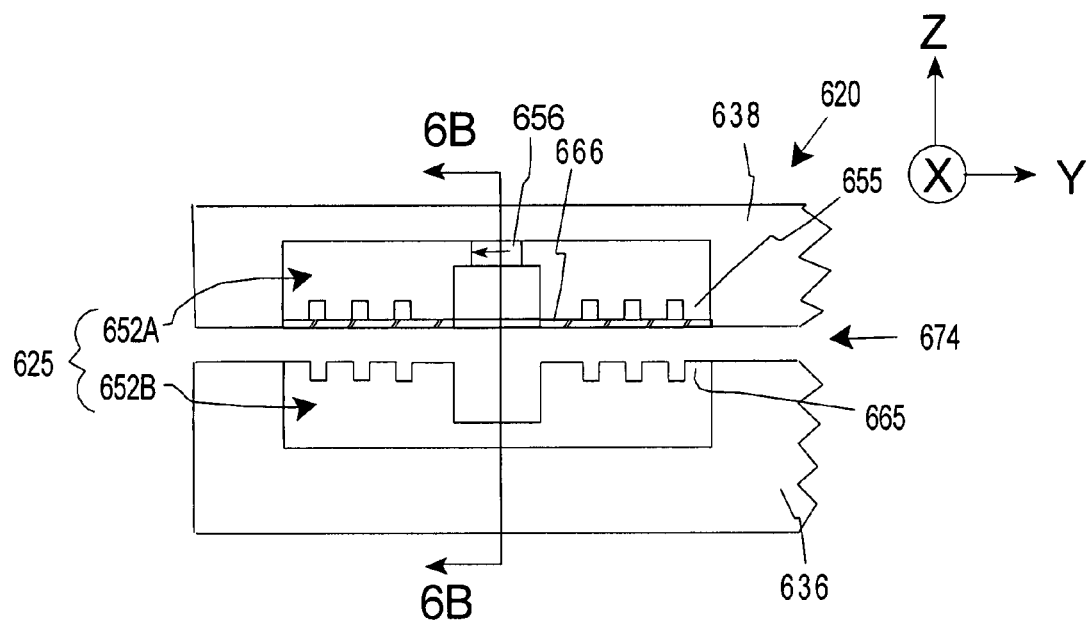
FIG. 6A is a simplified end view of still another embodiment of a portion of a stage assembly, in partial cut-away having features of the present invention.

FIG. 6A is a simplified end view of a portion of the stage assembly 620, in partial cut-away including a portion of the guide bar 638, a portion of the stage base 636, and another embodiment of the damper 625 including a first damper subassembly 652A and a second subassembly 652B.

In this embodiment, the first damper subassembly 652A and the second damper subassembly 652B are somewhat similar to the corresponding components described above and illustrated in FIGS. 5A and 5B. However, in this embodiment, the conductor 666 (in cut-away) is a shorted coil that is positioned on and secured to the first teeth 655.

With the present design, a magnetic field flows between the first teeth 655 and the corresponding second teeth 665 and there is a strong magnetic flux in the gap 674 between the damper subassemblies 652A, 652B between the opposing teeth. Further, the movement of the first damper subassembly 652A relative to the second damper subassembly 652B along the Y axis induces the flow of current in the conductor 666 because each point of the conductor sees a changing flux. This generates eddy current damping.

In this embodiment, there is no relative movement between the conductor 666 and the magnet array 656. In this design, the strength of the magnetic field changes during movement along the Y axis and this induces the flow of current in the conductor 466.

Additionally, in this embodiment, the damper 625 also acts as a variable-reluctance electromagnetic guide for the moving guide bar 638 that allows for motion in the X direction and self-centering stiffness along the Y axis.

Figure 6B:
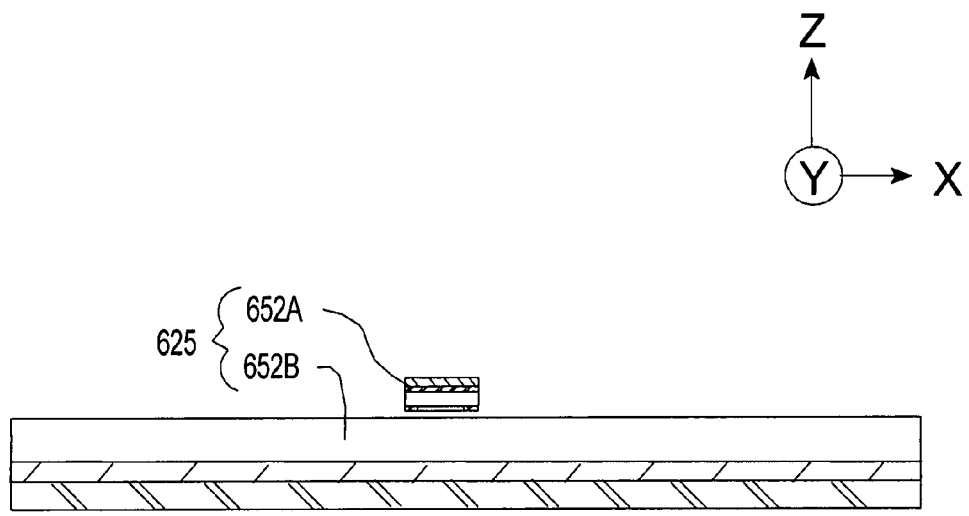
FIG. 6B is a simplified view taken on line 6B-6B in FIG. 6A.

FIG. 6B illustrates a simplified cut-away view taken on line 6B-6B of FIG. 6A of the damper 625 including the damper subassemblies 652A, 652B.

Figure 7A:
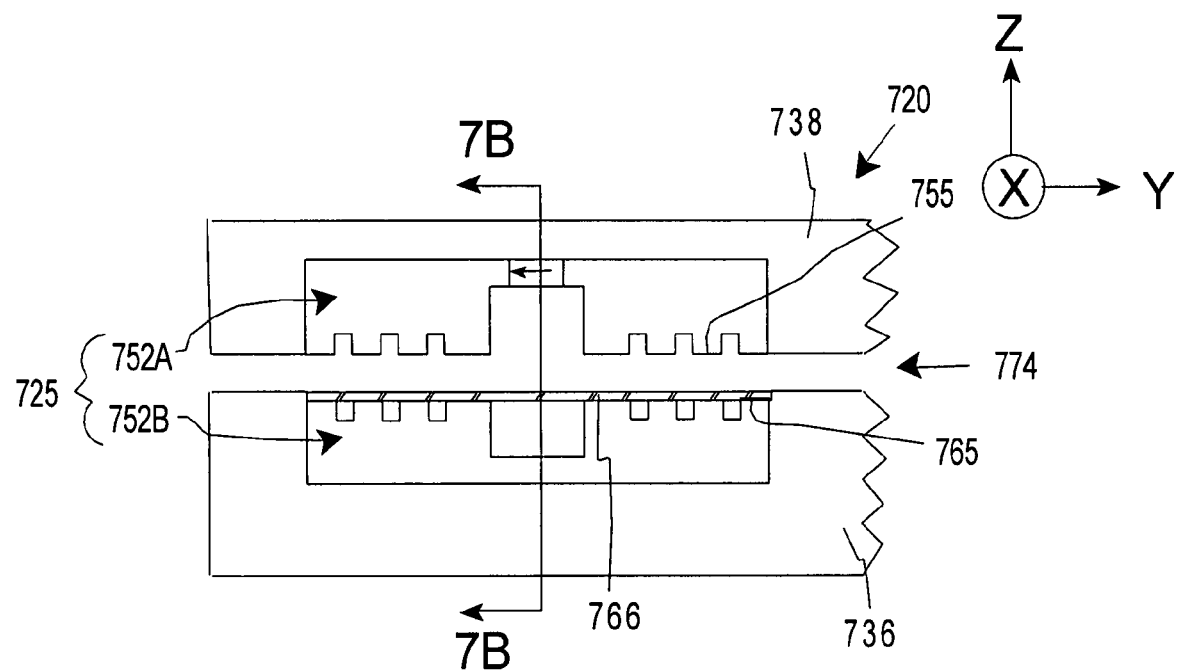
FIG. 7A is a simplified end view of yet another embodiment of a portion of a stage assembly, in partial cut-away having features of the present invention.

FIG. 7A is a simplified end view of a portion of the stage assembly 720, in partial cut-away including a portion of the guide bar 738, a portion of the stage base 736, and another embodiment of the damper 725 including a first damper subassembly 752A and a second subassembly 752B.

In this embodiment, the first damper subassembly 752A and the second damper subassembly 752B are somewhat similar to the corresponding components described above and illustrated in FIGS. 5A and 5B. However, in this embodiment, the conductor 766 (in cut-away) is a highly conductive plate that is positioned on and secured to the second teeth 765. The conductive plate, for example, can be made of aluminum or copper. In alternative, non-exclusive embodiments, the plate can have a thickness of between approximately 0.1 mm to 2.0 mm.

With the present design, a magnetic field flows between the first teeth 755 and the corresponding second teeth 756 and there is a strong magnetic flux in the gap 774 between the damper subassemblies 752A, 752B between the opposing teeth. Further, the movement of the first damper subassembly 752A relative to the second damper subassembly 752B along the Y axis induces the flow of current in the conductor 766 because each point of the conductor sees a changing flux. This generates eddy current damping.

Additionally, in this embodiment, the damper 725 also acts as a variable-reluctance electromagnetic guide for the moving guide bar 738 that allows for motion in the X direction and self-centering stiffness along the Y axis.

Figure 7B:
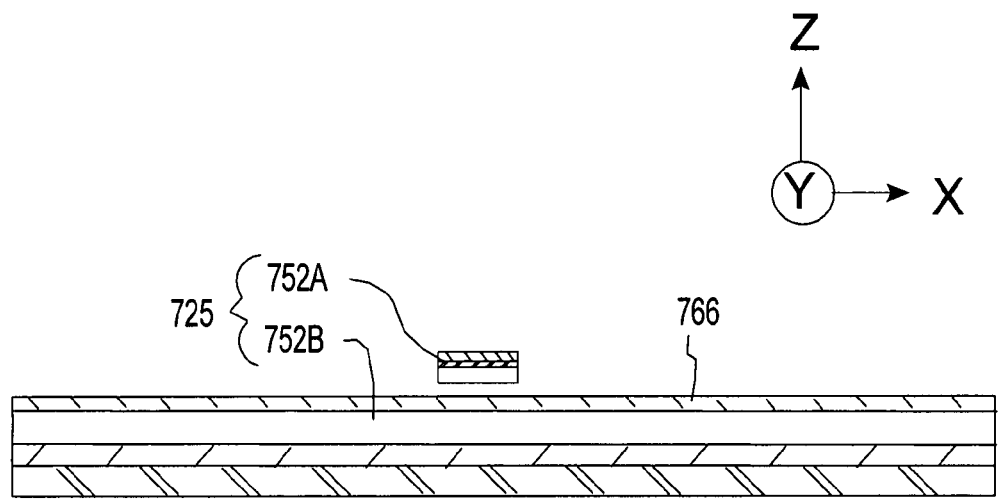
FIG. 7B is a simplified view taken on line 7B-7B in FIG. 7A.

FIG. 7B illustrates a simplified cross-sectional view taken on line 7B-7B of FIG. 7A including the damper 725 with the damper subassemblies 752A, 752B. FIG. 7B also illustrates that the conductor 766 extends the length of the movement of the first damper subassembly 752A.

Figure 8A:
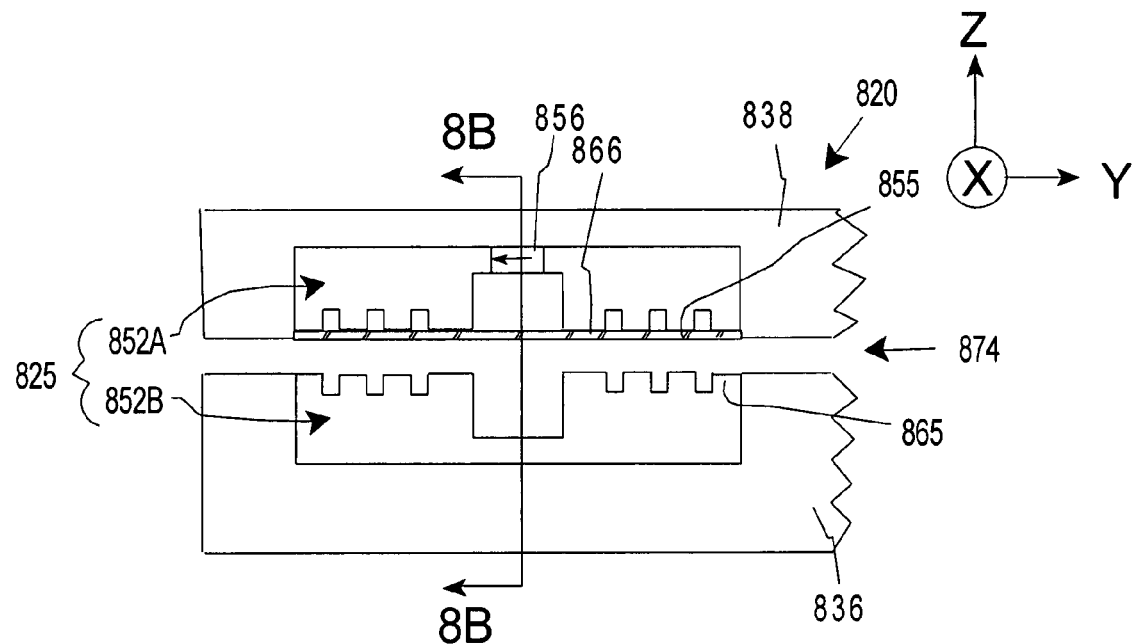
FIG. 8A is a simplified end view of still another embodiment of a portion of a stage assembly, in partial cut-away having features of the present invention.

FIG. 8A is a simplified end view of a portion of the stage assembly 820, in partial cut-away including a portion of the guide bar 838, a portion of the stage base 836, and another embodiment of the damper 825 including a first damper subassembly 852A and a second subassembly 852B.

In this embodiment, the first damper subassembly 852A and the second damper subassembly 852B are somewhat similar to the corresponding components described above and illustrated in FIGS. 7A and 7B. However, in this embodiment, the conductor 866 (in cut-away) is a highly conductive plate that is positioned on and secured to the first teeth 855.

With the present design, a magnetic field flows between the first teeth 855 and the corresponding second teeth 856 and there is a strong magnetic flux in the gap 874 between the damper subassemblies 852A, 852B between the opposing teeth. Further, the movement of the first damper subassembly 852A relative to the second damper subassembly 852B along the Y axis induces the flow of current in the conductor 866 because each point of the conductor sees a changing flux. This generates eddy current damping.

In this embodiment, there is no relative movement between the conductor 866 and the magnet array 856. In this design, the strength of the magnetic field changes during movement along the Y axis and this induces the flow of current in the conductor 866.

Additionally, in this embodiment, the damper 825 also acts as a variable-reluctance electromagnetic guide for the moving guide bar 838 that allows for motion in the X direction and self-centering stiffness along the Y axis.

Figure 8B:
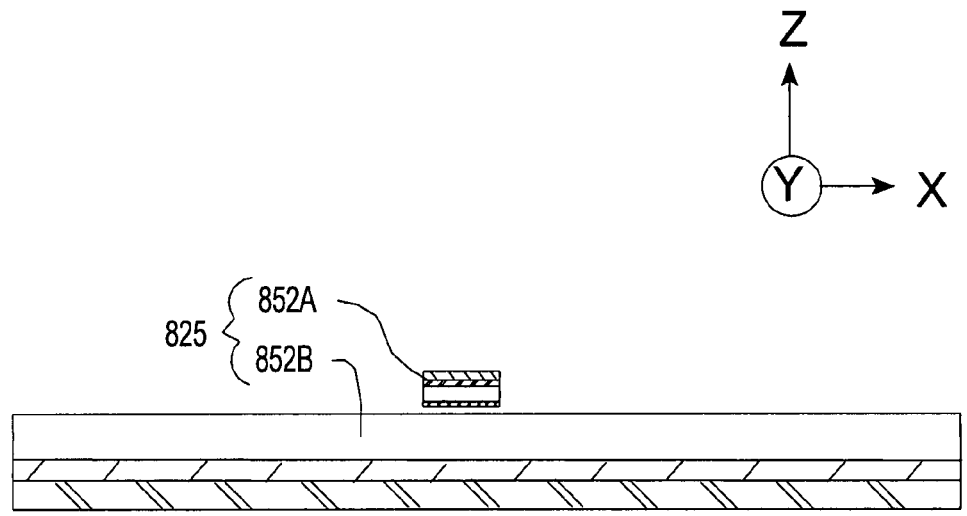
FIG. 8B is a simplified view taken on line 8B-8B in FIG. 8A.

FIG. 8B illustrates a simplified cross-sectional view taken on line 8B-8B of FIG. 8A including the damper 825 with the damper subassemblies 852A, 852B.

Figure 9A:
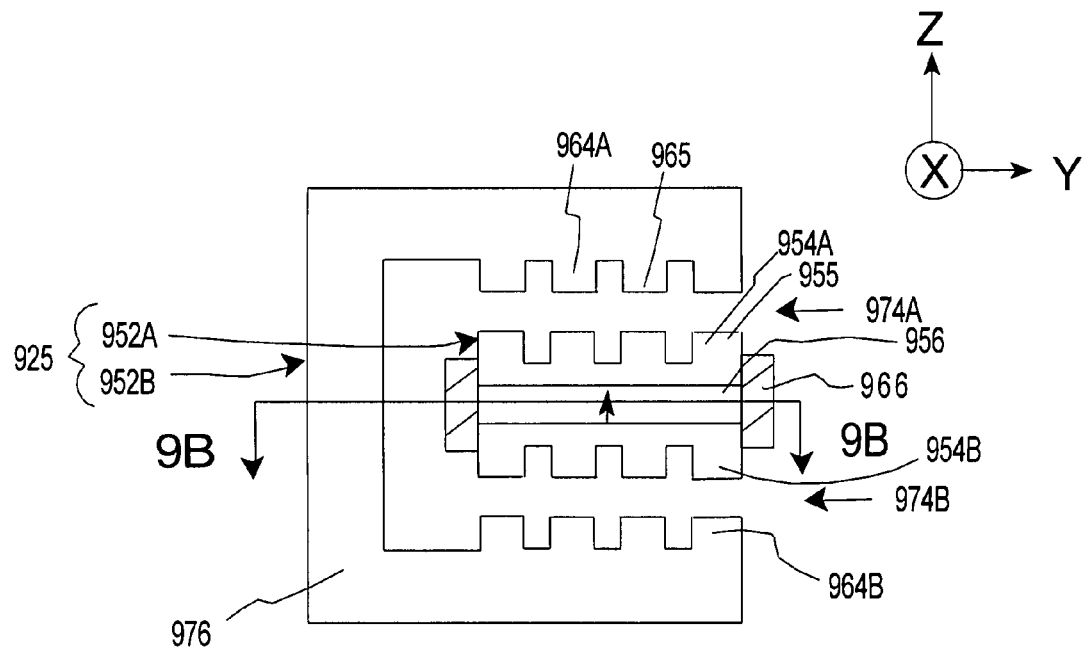
FIG. 9A is a simplified end view of one embodiment of a damper, in partial cut-away having features of the present invention.

FIG. 9A is a simplified end view, in partial cut-away of another embodiment of the damper 925 including a first damper subassembly 952A and a second subassembly 952B. In this embodiment, the first damper subassembly 952A includes an upper first tooth assembly 954A, a lower first tooth assembly 954B, a magnet array 956 positioned between the first tooth assemblies 954A, 954B, and a conductor 966 (in cut-away), e.g. a shorted coil, that encircles the magnet 956. Further, the second damper subassembly 952B includes a generally "C" shaped frame 976 that defines an upper second tooth assembly 964A and a lower second tooth assembly 964B. In this embodiment, the first damper subassembly 952A is positioned between the second tooth assemblies 964A, 964B. The frame 976 can be made of iron.

It should be noted that (i) an upper gap 974A separates the upper second tooth assembly 964A from the upper first tooth assembly 954A and, (ii) a lower gap 974B separates the lower first tooth assembly 954B from the lower second tooth assembly 964B.

With the present design, magnetic flux flows between the first teeth 955 of the first damper subassembly 952A and the corresponding second teeth 965 the second damper subassembly 952B, and passes through the conductor 966. With this design, movement of the first damper subassembly 952A relative to the second damper subassembly 952B along the Y axis changes the reluctance of the magnetic circuit, changing the amount of flux, and thereby induces the flow of current in the conductor 966. This generates eddy current damping. Stated in another fashion, the relative movement between the magnetic field and the conductor 966 provides damping.

It should be noted that because of the attraction between the first teeth 955 of the upper first tooth assembly 954A and the second teeth 965 of the upper second tooth assembly 964A, and the attraction between the first teeth 955 of the lower first tooth assembly 954B and the second teeth 965 of the lower second tooth assembly 964B, there is only a small net force acting between 954A and 964A.

In this embodiment, there is no relative movement between the conductor 966 and the magnet array 956. In this design, the strength of the magnetic field changes during movement along the Y axis and this induces the flow of current in the conductor 966.

Additionally, in this embodiment, the damper 925 also acts as a variable-reluctance electromagnetic guide for the moving guide bar (not shown) that allows for motion in the X direction and self-centering stiffness along the Y axis.

Figure 9B:
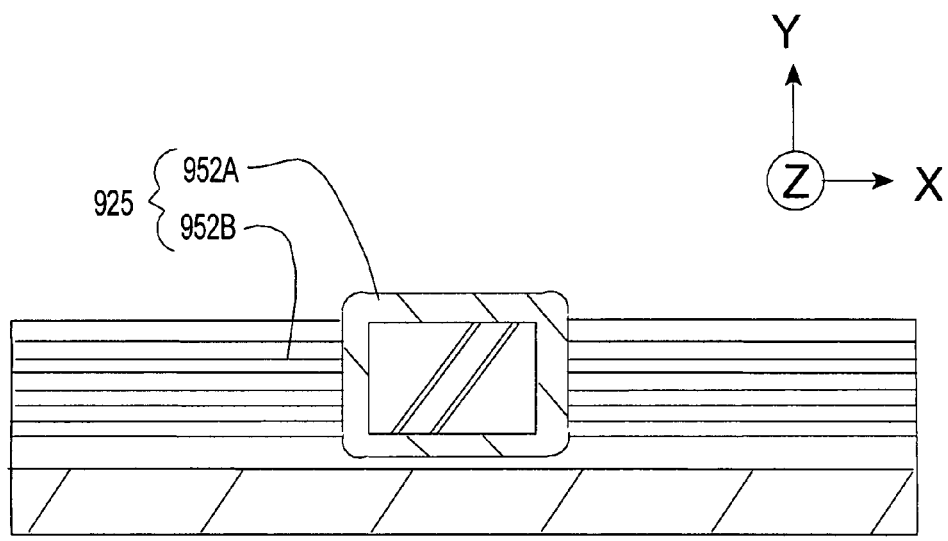
FIG. 9B is a simplified view taken on line 9B-9B in FIG. 9A.

FIG. 9B illustrates a simplified cross-sectional view taken on line 9B-9B of FIG. 9A of the damper 925 including the damper subassemblies 952A, 952B.

Figure 10A:
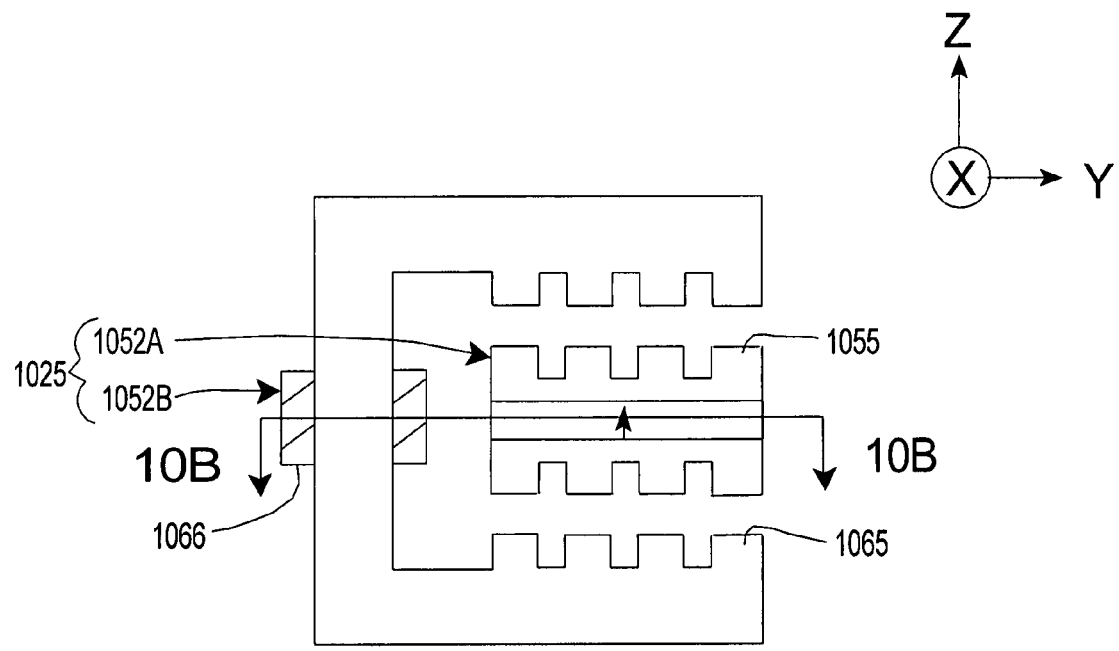
FIG. 10A is a simplified end view of still another embodiment of a damper, in partial cut-away having features of the present invention.

FIG. 10A is a simplified end view, in partial cut-away of another embodiment of the damper 1025 including a first damper subassembly 1052A and a second subassembly 1052B. In this embodiment, the first damper subassembly 1052A and the second damper subassembly 1052B are somewhat similar to the corresponding components described above and illustrated in FIGS. 9A and 9B. However, in this embodiment, the conductor 1066 (in cut-away) is coil that is secured to the C shaped frame of the second subassembly 1052B.

With the present design, a magnetic field flows between the first teeth 1055 of the first damper subassembly 1052A and the corresponding second teeth 1056 of the second damper subassembly 1052B. Further, relative movement between the damper subassemblies 1052A, 1052B along the Y axis induces the flow of current in the conductor 1066. This generates eddy current damping.

Additionally, in this embodiment, the damper 1025 also acts as a variable-reluctance electromagnetic guide for the moving guide bar (not shown) that allows for motion in the X direction and self-centering stiffness along the Y axis.

Figure 10B:
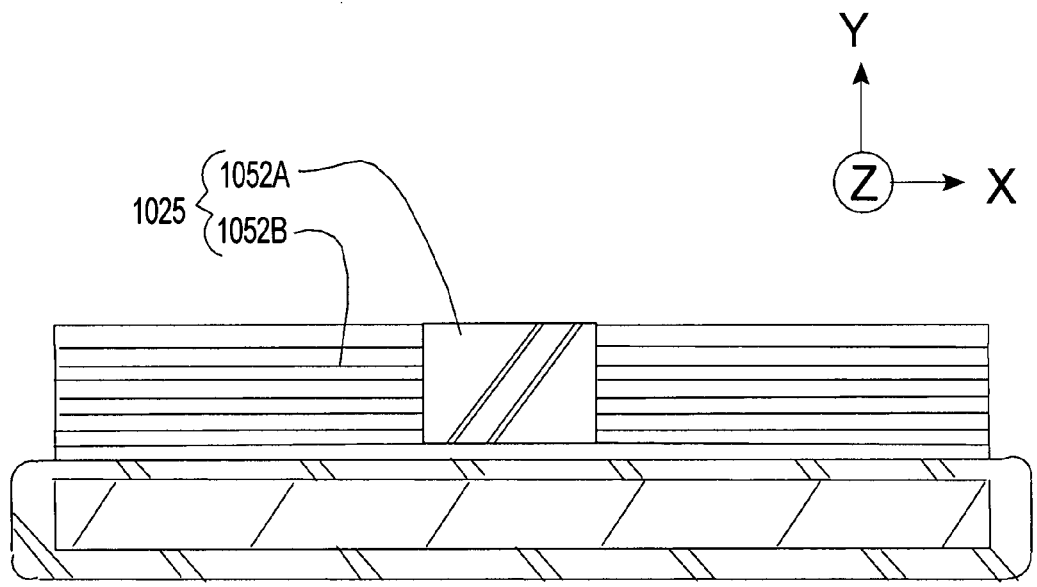
FIG. 10B is a simplified view taken on line 10B-10B in FIG. 10A.

FIG. 10B illustrates a simplified cross-sectional view taken on line 10B-10B of FIG. 10A of the damper 1025 including the damper subassemblies 1052A, 1052B.

Figure 11A:
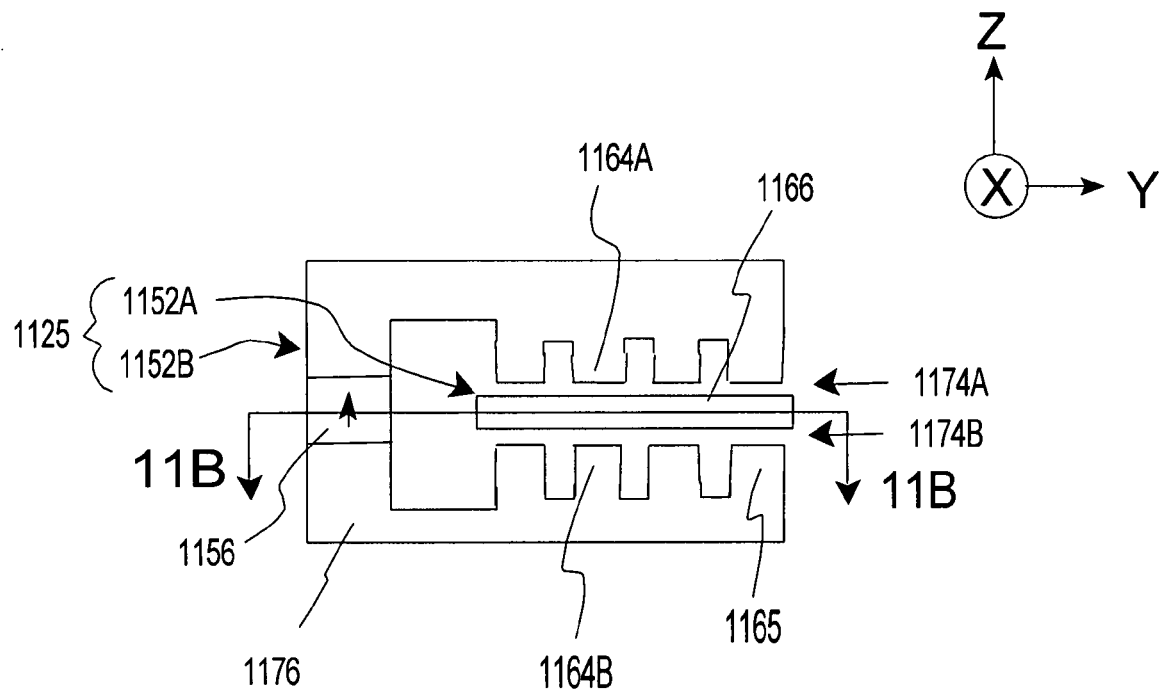
FIG. 11A is a simplified end view of yet another embodiment of a damper having features of the present invention.

FIG. 11A is a simplified end view of another embodiment of the damper 1125 including a first damper subassembly 1152A and a second subassembly 1152B. In this embodiment, the first damper subassembly 1152A includes a conductor 1166, e.g. a conductive plate, and the second damper subassembly 1152B includes a generally "C" shaped frame 1176 having an upper tooth assembly 1164A, a spaced apart lower tooth assembly 1164B, and a magnet array 1156 positioned between the tooth assemblies 1164A, 1164B. In this embodiment, the first damper subassembly 1152A is positioned between the tooth assemblies 1164A, 1164B.

With the present design, a magnetic field flows between the second teeth 1165 of the second damper subassembly 1162A. Further, relative movement between the damper subassemblies 1152A, 1152B along the Y axis induces the flow of current in the conductor 1166. This generates eddy current damping.

It this embodiment, (i) an upper gap 1174A separates the upper tooth assembly 1164A from the conductor 1166 and, (ii) a lower gap 1174B separates the lower tooth assembly 1154B from the conductor 1166.

It should be noted that in this embodiment, the damper 1125 does not act as a variable-reluctance electromagnetic guide for the moving guide bar (not shown). Accordingly, a separate guide may be necessary.

Figure 11B:
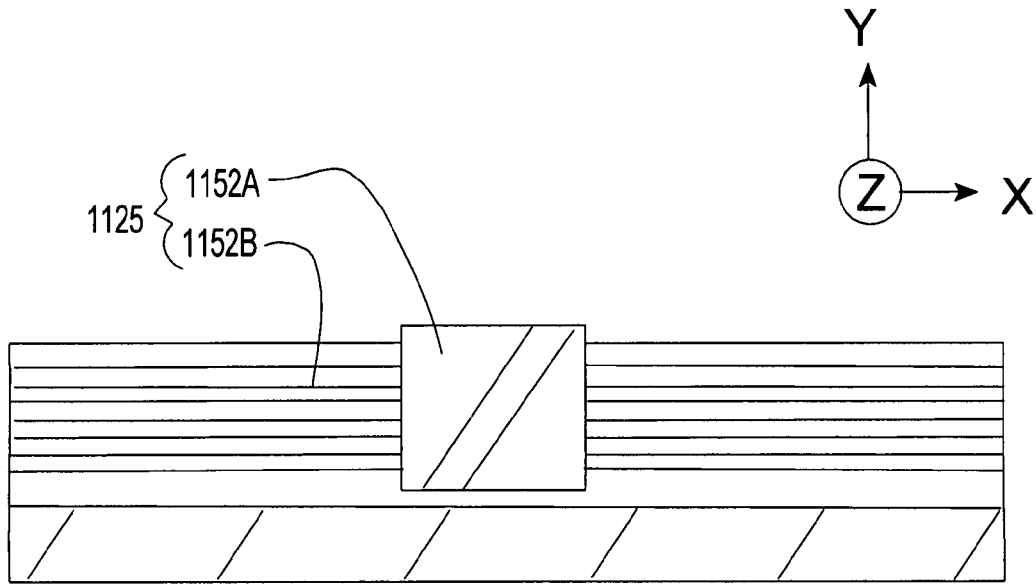
FIG. 11B is a simplified view taken on line 11B-11B in FIG. 11A.

FIG. 11B illustrates a simplified cross-sectional view taken on line 11B-11B of FIG. 11A of the damper 1125 including the damper subassemblies 1152A, 1152B.

Figure 12A:
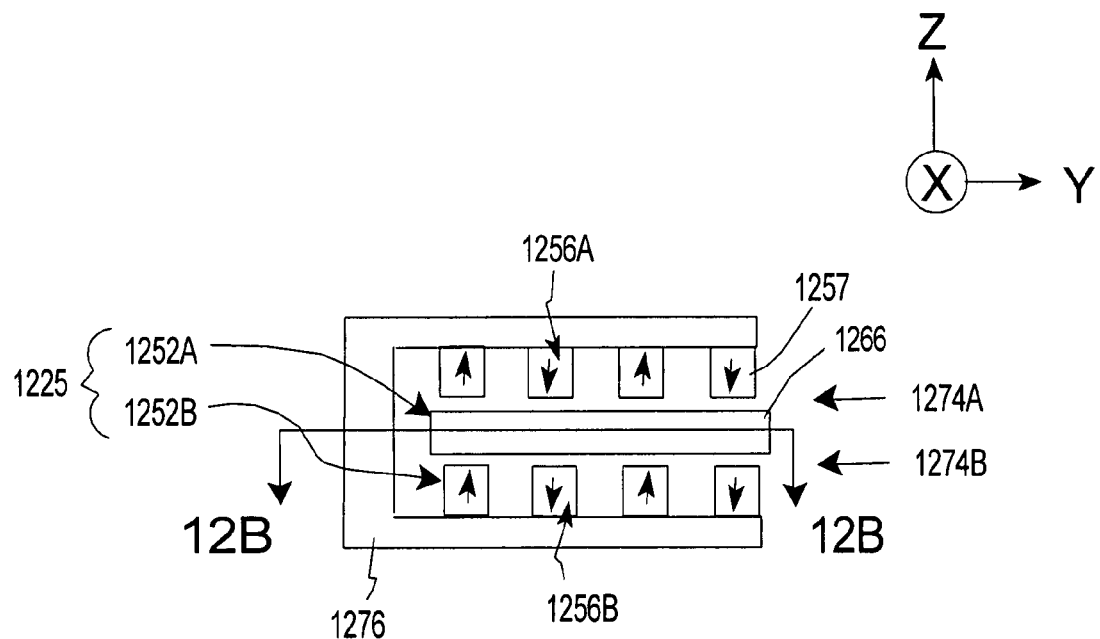
FIG. 12A is a simplified end view of still another embodiment of a damper having features of the present invention.

FIG. 12A is a simplified end view of another embodiment of the damper 1225 including a first damper subassembly 1252A and a second subassembly 1252B. In this embodiment, the first damper subassembly 1252A includes a conductor 1266, e.g. a conductive plate, and the second damper subassembly 1252B includes a generally "C" shaped frame 1276, an upper, first magnet array 1256A, and a spaced apart lower, second magnet array 1256B. In this embodiment, the first damper subassembly 1252A is positioned between the magnet arrays 1256A, 1256B.

Each of the magnet arrays 1256A, 1256B includes one or more magnets 1257. The design of each magnet array 1256A, 1256B and the number of magnets 1257 in each magnet array 1256A, 1256B can be varied to suit the design of the damper 1225. In the embodiment illustrated in FIG. 12A, each magnet array 1256A, 1256B includes four, spaced apart, substantially rectangular shaped magnets 1257. However, the shape of each magnet 1256 can be varied. Further, in FIG. 12A, adjacent magnets 1256 in each magnet array 1256A, 1256B are oppositely oriented in the vertical direction towards and away from the conductor 1266.

With the present design, a magnetic field flows between the magnet arrays 1256A, 1256B. Further, relative movement between the magnet arrays 1256A, 1256B and the conductor 1266 along the Y axis induces the flow of current in the conductor 1166. This generates eddy current damping.

It this embodiment, (i) an upper gap 1274A separates the first magnet array 1256A from the conductor 1266 and, (ii) a lower gap 1274B separates the second magnet array 1256B from the conductor 1266.

It should be noted that in this embodiment, the damper 1225 does not act as a variable-reluctance electromagnetic guide for the moving guide bar (not shown). Accordingly, a separate guide may be necessary.

Figure 12B:
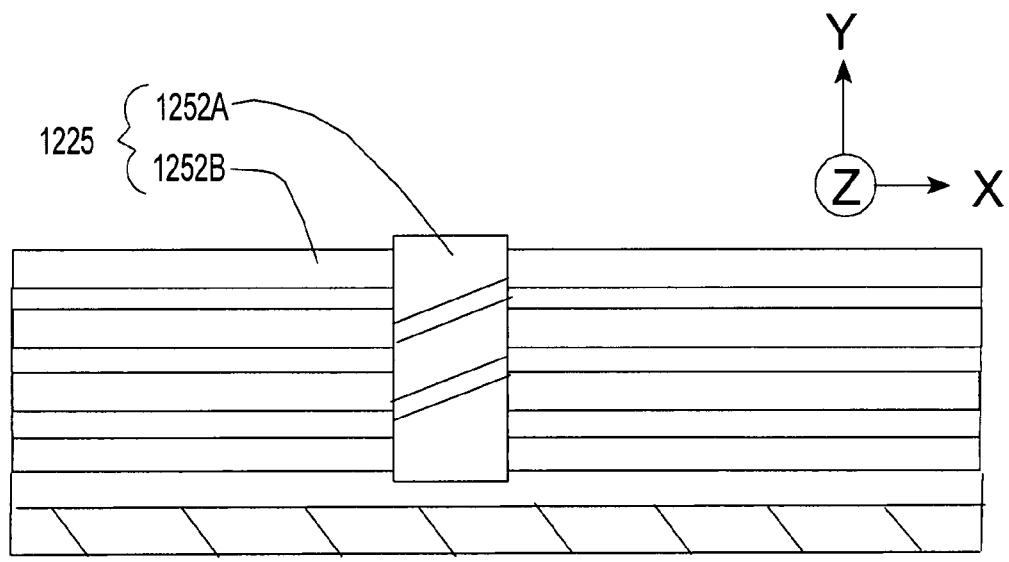
FIG. 12B is a simplified view taken on line 12B-12B in FIG. 12A.

FIG. 12B illustrates a simplified cross-sectional view taken on line 12B-12B of FIG. 12A of the damper 1225 including the damper subassemblies 1252A, 1252B.

Figure 13:
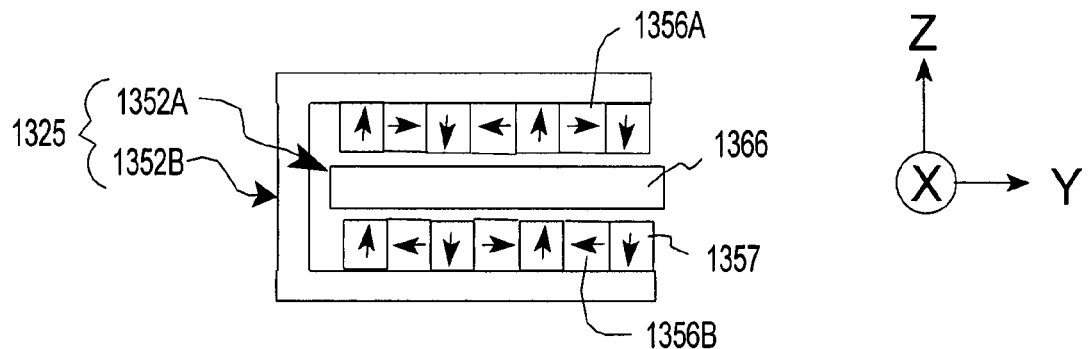
FIG. 13 is a simplified end view of another embodiment of a damper having features of the present invention.

FIG. 13 is a simplified end view of still another embodiment of the damper 1325 including a first damper subassembly 1352A and a second subassembly 1352B. In this embodiment, the first damper subassembly 1352A and the second damper subassembly 1352B are somewhat similar to the corresponding components described above and illustrated in FIGS. 12A and 12B. However, in FIG. 13, each of the magnet arrays 1356A, 1356B has a Halbach arrangement in which transversely oriented (relative to the conductor) magnets 1357 are positioned between the vertically oriented (relative to the conductor) magnets 1357.

With the present design, a magnetic field flows between the magnet arrays 1356A, 1356B. Further, relative movement between the magnet arrays 1356A, 1356B and the conductor 1366 along the Y axis induces the flow of current in the conductor 1366. This generates eddy current damping.

It should be noted that in this embodiment, the damper 1325 does not act as a variable-reluctance electromagnetic guide for the moving guide bar (not shown). Accordingly, a separate guide may be necessary.

Figure 14:
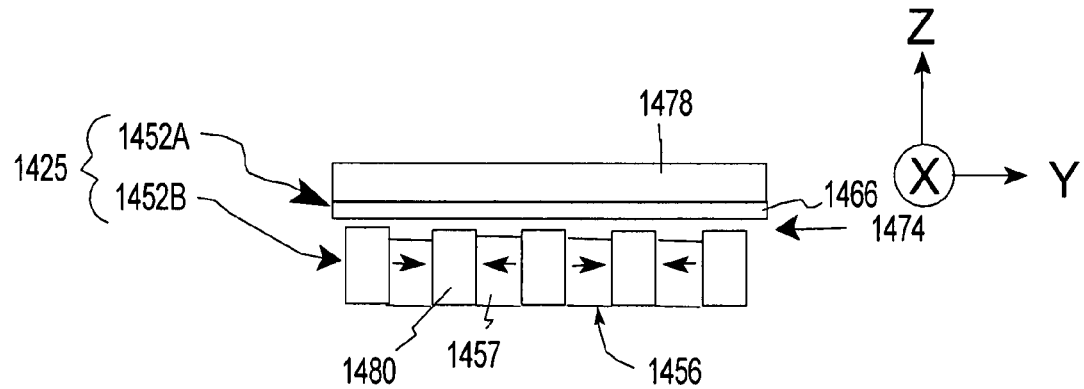
FIG. 14 is a simplified end view of yet another embodiment of a damper having features of the present invention.

FIG. 14 is a simplified end view of another embodiment of the damper 1425 including a first damper subassembly 1452A and a second subassembly 1452B. In this embodiment, (i) the first damper subassembly 1452A includes a conductor 1466, e.g. a conductive plate, and a backing plate 1478, e.g. an iron plate, and (ii) the second damper subassembly 1452B includes a magnet array 1456. In the illustrated embodiment, the magnet array 1480 includes a plurality of transversely oriented (relative to the conductor) magnets 1457 and a plurality of separation plates 1480, e.g. iron plates that separate the magnets 1457.

The design of the magnet array 1456 and the number of magnets 1457 in the magnet array 1456 can be varied to suit the design of the damper 1425. In the embodiment illustrated in FIG. 14, the magnet array 1456 includes four, substantially rectangular shaped magnets 1457. Further, in FIG. 14, sequentially positioned magnets 1457 are oppositely oriented.

With the present design, a magnetic field flows between (i) the magnet array 1456 and (ii) the backing plate 1478 and the conductor 1466. Further, relative movement between the magnet array 1456 and the conductor 1466 along the Y axis induces the flow of current in the conductor 1466. This generates eddy current damping.

It this embodiment, a gap 1474 separates the damper subassemblies 1452A, 1452B.

It should be noted that in this embodiment, the damper 1425 does not act as a variable-reluctance electromagnetic guide for the moving guide bar (not shown). Accordingly, a separate guide may be necessary.

Figure 15:
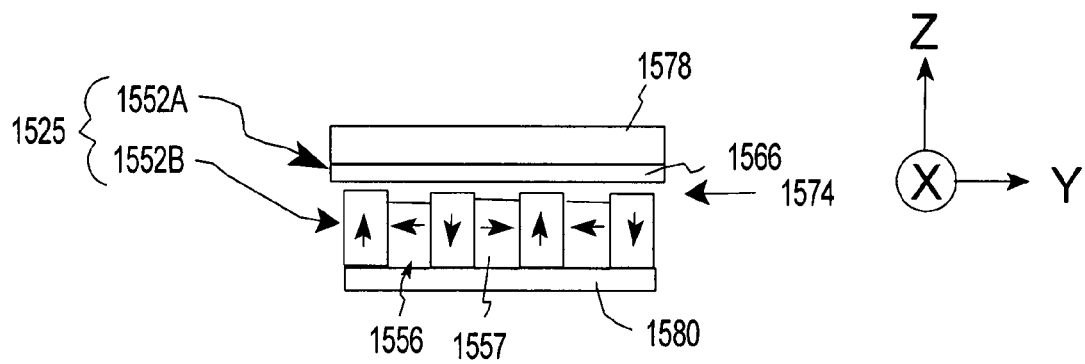
FIG. 15 is a simplified end view of still another embodiment of a damper having features of the present invention.

FIG. 15 is a simplified end view of another embodiment of the damper 1525 including a first damper subassembly 1552A and a second subassembly 1552B. In this embodiment, (i) the first damper subassembly 1552A includes a conductor 1566, e.g. a conductive plate, and a first backing plate 1578, e.g. an iron plate, and (ii) the second damper subassembly 1552B includes a magnet array 1556 and a backing plate 1580, e.g. an iron plate. In the illustrated embodiment, the magnet array 1556 includes a plurality of magnets 1557 oriented in a Halbach arrangement in which transverse oriented (relative to the conductor) magnets 1557 are positioned between the vertically oriented (relative to the conductor) magnets 1557.

The design of the magnet array 1556 and the number of magnets 1557 in the magnet array 1556 can be varied to suit the design of the damper 1525. In the embodiment illustrated in FIG. 15, the magnet array 1556 includes seven, substantially rectangular shaped magnets 1557.

With the present design, a magnetic field flows between (i) the magnet array 1556 and (ii) the backing plate 1578 and the conductor 1566. Further, relative movement between the magnet array 1556 and the conductor 1566 along the Y axis induces the flow of current in the conductor 1566. This generates eddy current damping.

It this embodiment, a gap 1574 separates the damper subassemblies 1552A, 1552B.

It should be noted that in this embodiment, the damper 1525 does not act as a variable-reluctance electromagnetic guide for the moving guide bar (not shown). Accordingly, a separate guide may be necessary.

Figure 16A:
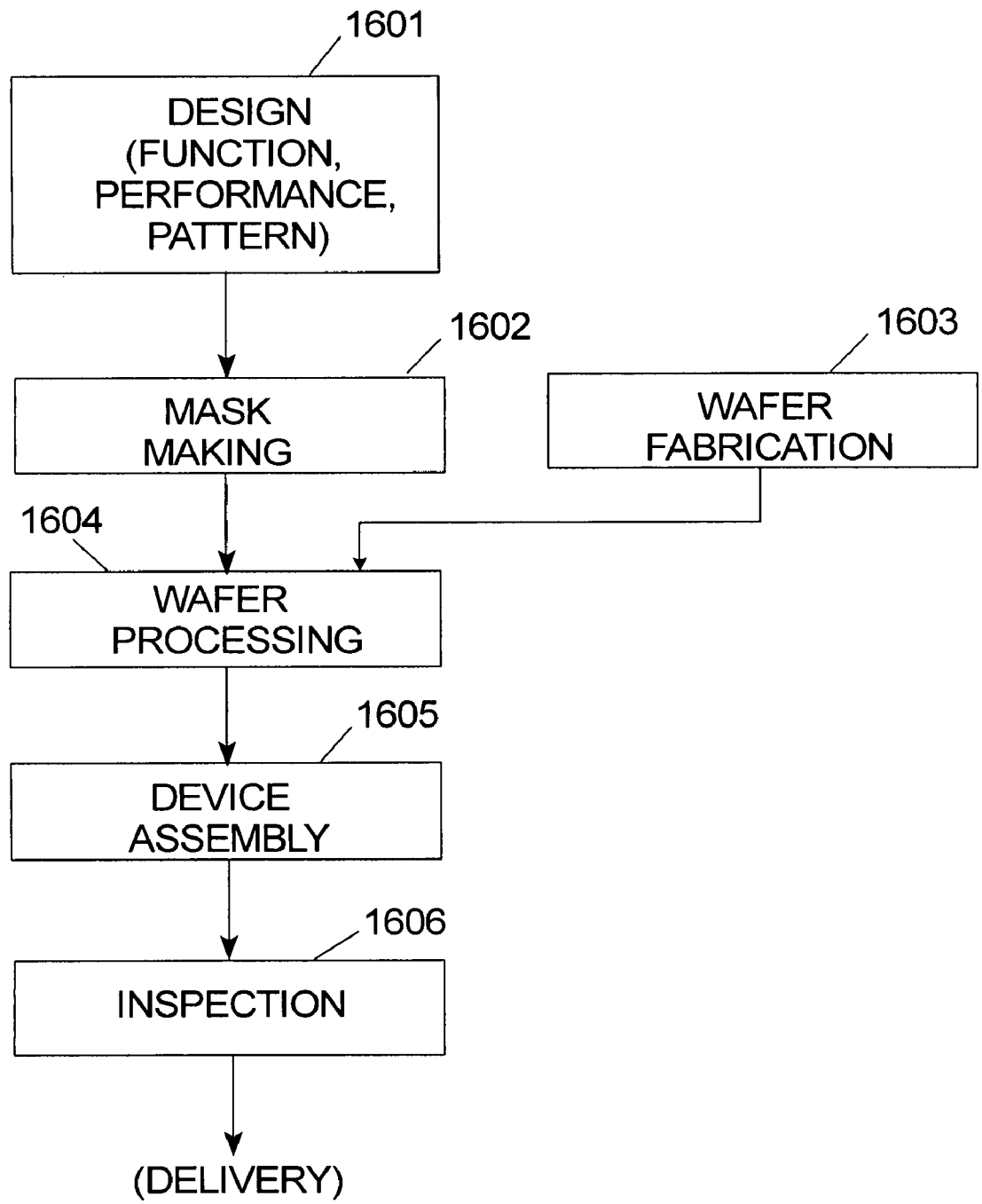
FIG. 16A is a flow chart that outlines a process for manufacturing a device in accordance with the present invention.

Semiconductor devices can be fabricated using the above described systems, by the process shown generally in FIG. 16A. In step 1601 the device's function and performance characteristics are designed. Next, in step 1602, a mask (reticle) having a pattern is designed according to the previous designing step, and in a parallel step 1603 a wafer is made from a silicon material. The mask pattern designed in step 1602 is exposed onto the wafer from step 1603 in step 1604 by a photolithography system described hereinabove in accordance with the present invention. In step 1605, the semiconductor device is assembled (including the dicing process, bonding process and packaging process), finally, the device is then inspected in step 1606.

Figure 16B:
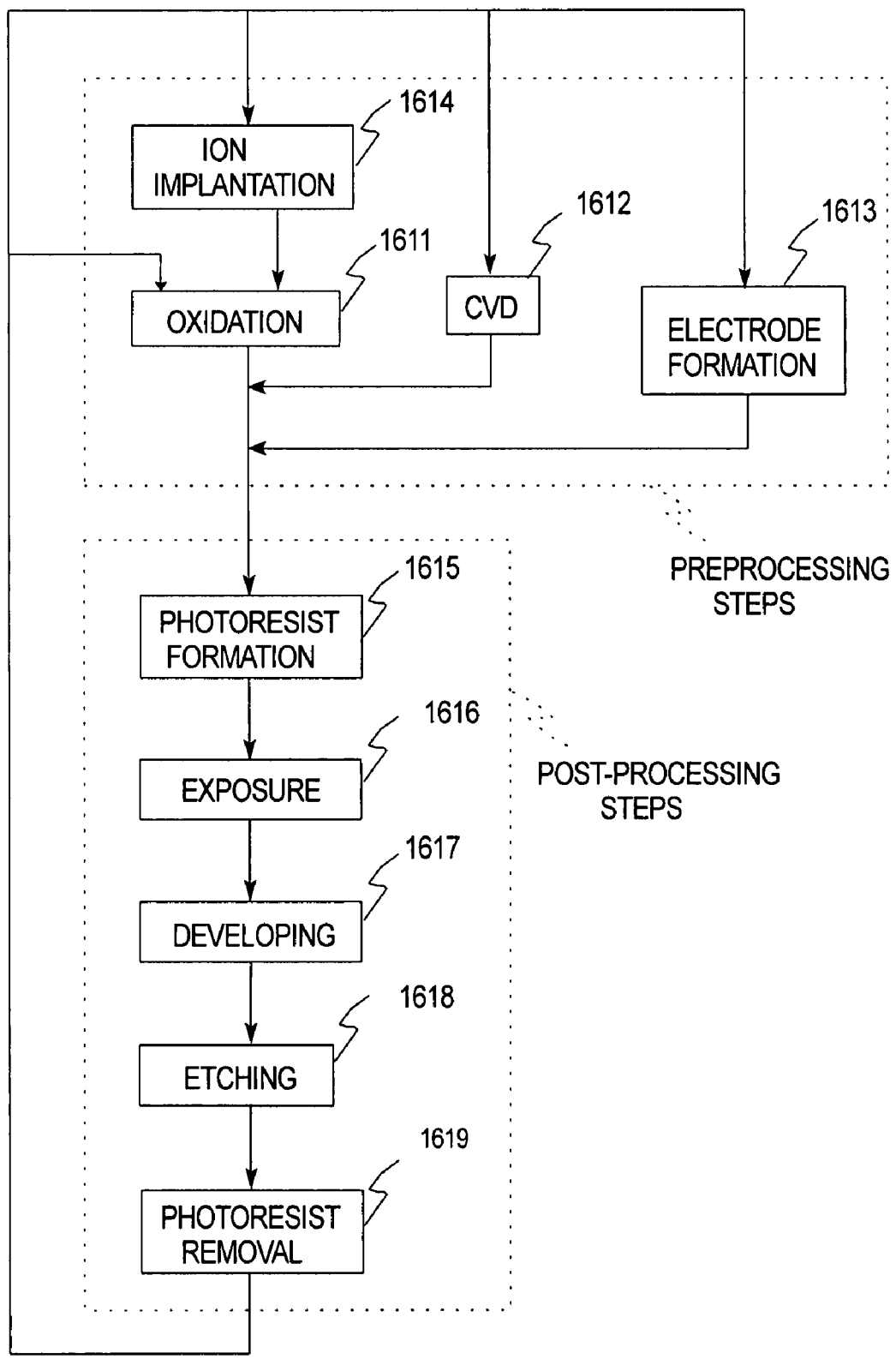
FIG. 16B is a flow chart that outlines device processing in more detail.

FIG. 16B illustrates a detailed flowchart example of the above-mentioned step 1604 in the case of fabricating semiconductor devices. In FIG. 16B, in step 1611 (oxidation step), the wafer surface is oxidized. In step 1612 (CVD step), an insulation film is formed on the wafer surface. In step 1613 (electrode formation step), electrodes are formed on the wafer by vapor deposition. In step 1614 (ion implantation step), ions are implanted in the wafer. The above mentioned steps 1611-1614 form the preprocessing steps for wafers during wafer processing, and selection is made at each step according to processing requirements.

At each stage of wafer processing, when the above-mentioned preprocessing steps have been completed, the following post-processing steps are implemented. During post-processing, first, in step 1615 (photoresist formation step), photoresist is applied to a wafer. Next, in step 1616 (exposure step), the above-mentioned exposure device is used to transfer the circuit pattern of a mask (reticle) to a wafer. Then in step 1617 (developing step), the exposed wafer is developed, and in step 1618 (etching step), parts other than residual photoresist (exposed material surface) are removed by etching. In step 1619 (photoresist removal step), unnecessary photoresist remaining after etching is removed. Multiple circuit patterns are formed by repetition of these preprocessing and post-processing steps.

It should be noted that in certain embodiments, the conductor can be removed and the device can be used as an undamped guide. For example, in one or more of the embodiments illustrated in FIGS. 3A-11B, the conductor can be removed and the device can function as an undamped guide. Further, the undamped guide can be used in conjunction with one or more of the other dampers, e.g. illustrated in FIGS. 12A-15, disclosed herein.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. A stage assembly comprising:
   a stage base;
   a first stage;
   a mover assembly that moves the first stage relative to the stage base along a first axis, the stage base guiding movement of the first stage relative to the stage base along the first axis; and
   a passive, electromagnetic damper for passively damping movement of the first stage relative to the stage base along a second axis that intersects the first axis;
   wherein the mover assembly moves the first stage about a third axis that is orthogonal to the first axis and the second axis.

2. The stage assembly of claim 1 further comprising a second stage, wherein the mover assembly moves the second stage relative to the first stage along the second axis.

3. The stage assembly of claim 1 wherein the stage base guides the movement of the first stage about the third axis.

4. The stage assembly of claim 1 wherein the damper also guides the movement of the first stage along the second axis.

5. The stage assembly of claim 1 wherein the damper includes a magnet array that produces a magnetic field having a magnetic flux, and a conductor positioned in the magnetic field, wherein relative movement between the first stage and the stage base along the second axis causes a change in magnetic flux, which induces the flow of current in the conductor.

6. The stage assembly of claim 1 wherein the damper includes a magnet array that produces a magnetic field having a magnetic flux, and a conductor positioned in the magnetic field, wherein relative movement between the conductor and the magnetic field induces the flow of current in the conductor because the magnetic field varies along the second axis.

7. A stage assembly comprising:
   a stage base;
   a first stage;
   a mover assembly that moves the first stage relative to the stage base along a first axis; and
   a passive, electromagnetic damper for passively damping movement of the first stage relative to the stage base along a second axis that intersects the first axis, wherein the damper includes a magnet array that produces a magnetic field having a magnetic flux, and a conductor positioned in the magnetic field, and wherein relative movement between the first stage and the stage base along the second axis induces the flow of current in the conductor and eddy current damping.

8. The stage assembly of claim 7 wherein the conductor is a shorted coil.

9. The stage assembly of claim 7 wherein the conductor is a conductive plate.

10. The stage assembly of claim 7 wherein the magnet array includes at least one magnet.

11. The stage assembly of claim 7 wherein the magnet array includes a plurality of differently oriented magnets.

12. The stage assembly of claim 11 wherein the magnets are arranged in a Halbach type arrangement.

13. The stage assembly of claim 11 wherein the magnet array includes a plurality of separation plates that are alternatively positioned with the magnets.

14. A stage assembly comprising:
   a stage base;
   a first stage;
   a mover assembly that moves the first stage relative to the stage base along a first axis; and
   a passive, electromagnetic damper for passively damping movement of the first stage relative to the stage base along a second axis that intersects the first axis, wherein the damper includes a pair of spaced apart magnet arrays that produce a magnetic field and a conductor positioned in the magnetic field between the magnet arrays, and wherein relative movement between the first stage and the stage base along the second axis induces the flow of current in the conductor and eddy current damping.

15. The stage assembly of claim 14 wherein each magnet array includes a plurality of differently oriented magnets.

16. The stage assembly of claim 15 wherein the magnets of each magnet array are arranged in a Halbach type arrangement.

17. A stage assembly comprising:
   a stage base;
   a first stage;
   a mover assembly that moves the first stage relative to the stage base along a first axis; and
   a passive, electromagnetic damper for passively damping movement of the first stage relative to the stage base along a second axis that intersects the first axis, wherein the damper includes a first damper subassembly that is coupled to the first stage and a second damper subassembly that is coupled to the stage base.

18. The stage assembly of claim 17 wherein one of the damper subassemblies includes a magnet array that produces by a magnetic field and the other damper subassembly includes a conductor that is positioned within the magnetic field.

19. The stage assembly of claim 18 wherein relative motion between the subassemblies induces the flow of current in the conductor.

20. The stage assembly of claim 17 wherein one of the damper subassemblies includes a magnet array that produces a magnetic field and a conductor that is positioned within the magnetic field.

21. The stage assembly of claim 20 wherein relative motion between the subassemblies induces the flow of current in the conductor.

22. The stage assembly of claim 17 wherein one of the damper subassemblies includes a plurality of spaced apart teeth.

23. The stage assembly of claim 17 wherein each of the damper subassemblies includes a plurality of spaced apart teeth.

24. An exposure apparatus including an illumination system and the stage assembly of claim 17.

25. A method for manufacturing a device, the method comprising the steps of providing a substrate and transferring an image to the substrate with the exposure apparatus of claim 24.

26. A method for manufacturing a wafer, the method comprising the steps of providing a substrate and transferring an image to the substrate with the exposure apparatus of claim 24.

27. A stage assembly comprising: a stage base; a first stage; a mover assembly that moves the first stage relative to the stage base along a first axis, the stage base guiding movement of the first stage relative to the stage base along the first axis; and a passive, electromagnetic damper for passively damping movement of the first stage relative to the stage base along a second axis that intersects the first axis; wherein the damper includes a first damper subassembly including a magnet array and a second damper subassembly including a conductor, wherein relative movement between the damper subassemblies along the second axis induces the flow of current in the conductor, but wherein relative movement between the damper subassemblies along the first axis does not induce the flow of current in the conductor.

28. A stage assembly comprising:
a first stage;
a stage base that supports the first stage;
a mover assembly that moves the first stage relative to the stage base along a first axis; and
a passive, electromagnetic damper for passively damping movement of the first stage relative to the stage base along a second axis that intersects the first axis, the damper including a first damper subassembly that is coupled to the first stage and a second damper subassembly that is coupled to the stage base, wherein at least one of the damper subassemblies includes a magnet array that produces a magnetic field and wherein at least one of the damper subassemblies includes a conductor positioned in the magnetic field, wherein relative movement between the damper subassemblies induces the flow of current in the conductor and eddy current damping.

29. The stage assembly of claim 28 wherein the conductor is a shorted coil.

30. The stage assembly of claim 28 wherein the conductor is a conductive plate.

31. The stage assembly of claim 28 wherein the magnet array includes at least one magnet.

32. The stage assembly of claim 28 wherein the magnet array includes a plurality of differently oriented magnets.

33. The stage assembly of claim 32 wherein the magnets are arranged in a Halbach type arrangement.

34. The stage assembly of claim 32 wherein the magnet array includes a plurality of separation plates that are alternatively positioned with the magnets.

35. The stage assembly of claim 28 wherein the damper includes a second magnet array and the conductor is positioned between the magnet arrays.

36. The stage assembly of claim 28 wherein one of the damper subassemblies includes a plurality of spaced apart teeth.

37. The stage assembly of claim 28 wherein each of the damper subassemblies includes a plurality of spaced apart teeth.

38. The stage assembly of claim 28 further comprising a second stage, wherein the mover assembly moves the second stage relative to the first stage along the second axis.

39. The stage assembly of claim 28 wherein the stage base guides the movement of the first stage about a third axis that is orthogonal to the first and second axes.

40. The stage assembly of claim 28 wherein the damper also guides the movement of the first stage along a second axis.

41. The stage assembly of claim 28 wherein relative movement between the damper subassemblies causes a change in magnetic flux, which induces the flow of current in the conductor.

42. The stage assembly of claim 28 wherein relative movement between the damper subassemblies induces the flow of current in the conductor because the magnetic field varies along the second axis.

43. The stage assembly of claim 28 wherein relative movement between the damper subassemblies along the second axis induces the flow of current in the conductor, but wherein relative movement between the damper subassemblies along the first axis does not induce the flow of current in the conductor.

44. An exposure apparatus including an illumination system and the stage assembly of claim 28.

45. A method for manufacturing a device, the method comprising the steps of providing a substrate and transferring an image to the substrate with the exposure apparatus of claim 44.

46. A method for manufacturing a wafer, the method comprising the steps of providing a substrate and transferring an image to the substrate with the exposure apparatus of claim 44.

47. A method for moving a stage, the method comprising the steps of:
supporting the stage with a stage base;
moving the stage relative to the stage base along a first axis with a mover assembly; and
passively damping movement of the first stage relative to the stage base along a second axis that intersects the first axis with a passive, electromagnetic damper, wherein the damper includes a first damper subassembly that is coupled to the first stage and a second damper subassembly that is coupled to the stage base.

48. The method of claim 47 wherein the magnets are arranged in a Halbach type arrangement.

49. The method of claim 47 wherein the magnet array includes a plurality of separation plates that are alternatively positioned with the magnets.

50. The method of claim 47 wherein one of the damper subassemblies includes a plurality of spaced apart teeth.

51. A method for making an exposure apparatus comprising the steps of providing an illumination source, coupling a work piece to the stage, moving the stage by the method of claim 47.

52. A method for moving a stage, the method comprising the steps of:

supporting the stage with a stage base;

moving the stage relative to the stage base along a first axis with a mover assembly; and passively damping movement of the first stage relative to the stage base along a second axis that intersects the first axis with a passive, electromagnetic damper, wherein the damper includes a magnet array that is surrounded by a magnetic field and a conductor positioned in the magnetic field, wherein relative movement between the stage and the stage base induces the flow of current in the conductor and eddy current damping.

53. The method of claim 52 wherein the magnet array includes at least one magnet.

54. The method of claim 52 wherein the magnet array includes a plurality of differently oriented magnets.

55. The method of claim 52 wherein the damper includes a pair of spaced apart magnet arrays that produce a magnetic field and a conductor positioned in the magnetic field between the magnet arrays, wherein relative movement between the stage and the stage base induces the flow of current in the conductor and eddy current damping.

56. A linear motor comprising:

a first member that includes a magnet;

a second member that includes a conductor, the conductor interacts with the magnet and moves relative to the first member along a first axis; and an electromagnetic damper device that damps movement of one of the first member and the second member relative to the other member along a second axis that intersects the first axis; wherein the damper device includes a second magnet that differs from the magnet of the first member, and a second conductor that differs from the conductor of the second member, and relative movement between the first member and the second member along the second axis induces the flow of current in the conductor.

* * * * *